US012681538B2

(12) United States Patent
Lee et al.

(10) Patent No.: US 12,681,538 B2
(45) Date of Patent: Jul. 14, 2026

(54) ELECTRONIC DEVICE COMPRISING FLEXIBLE DISPLAY AND METHOD FOR DETECTING STATE OF ELECTRONIC DEVICE

(71) Applicant: Samsung Electronics Co., Ltd., Suwon-si (KR)

(72) Inventors: Gihoon Lee, Suwon-si (KR); Gyuyeong Cho, Suwon-si (KR); Jaedeok Lim, Suwon-si (KR); Yongyoun Kim, Suwon-si (KR); Hyein Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 122 days.

(21) Appl. No.: 18/456,192

(22) Filed: Aug. 25, 2023

(65) Prior Publication Data

US 2023/0400886 A1 Dec. 14, 2023

Related U.S. Application Data

(63) Continuation of application No. PCT/KR2022/001682, filed on Feb. 3, 2022.

(30) Foreign Application Priority Data

Feb. 26, 2021 (KR) ........................ 10-2021-0026629

(51) Int. Cl.
*G06F 1/16* (2006.01)
*G01D 5/12* (2006.01)

(52) U.S. Cl.
CPC ............. *G06F 1/1652* (2013.01); *G01D 5/12* (2013.01); *G06F 1/1641* (2013.01)

(58) Field of Classification Search
CPC .... G06F 1/1652; G06F 1/1641; G06F 1/1624; G06F 1/1677; G01D 5/12; H01F 7/0294
See application file for complete search history.

(56) References Cited

U.S. PATENT DOCUMENTS

| | | | |
|---|---|---|---|
| 9,417,295 B2 | 8/2016 | Friedrich et al. | |
| 9,541,424 B2 | 1/2017 | Friedrich et al. | |
| (Continued) | | | |

FOREIGN PATENT DOCUMENTS

| | | |
|---|---|---|
| CN | 110849257 | 2/2020 |
| CN | 111023956 | 4/2020 |
| (Continued) | | |

OTHER PUBLICATIONS

Extended Search Report dated Jun. 11, 2024 in European Patent Application No. 22759928.9.

(Continued)

*Primary Examiner* — Christopher E Mahoney
(74) *Attorney, Agent, or Firm* — Nixon & Vanderhye, P.C.

(57) ABSTRACT

An example electronic device includes a first housing; a second housing coupled to be movable with respect to the first housing; a flexible display disposed on at least a portion of the first housing and the second housing; a magnet having at least two polarities arranged in a first direction in one plane; a sensor configured to move in the first direction along the central axis of the magnet as the arrangement of the second housing relative to the first housing is changed, and detect at least two or more direction components including a first direction component and a second direction component of magnetic flux density; a memory configured to store state reference information on a state of the electronic device corresponding to the first direction component and the second direction component; and a processor configured to obtain magnetic detection data including the at (Continued)

least two or more direction components from the sensor; and detect the state of the electronic device based on the obtained magnetic detection data and the state reference information.

20 Claims, 22 Drawing Sheets

(56)                References Cited

U.S. PATENT DOCUMENTS

| | | | |
|---|---|---|---|
| 9,578,766 | B2 | 2/2017 | Jin et al. |
| 9,892,490 | B2 | 2/2018 | Honda et al. |
| 10,073,668 | B2 | 9/2018 | Chun et al. |
| 10,104,787 | B2 | 10/2018 | Rothkopf et al. |
| 10,474,202 | B2 | 11/2019 | Kitade |
| 10,694,624 | B2 | 6/2020 | Rothkopf et al. |
| 11,204,624 | B2 | 12/2021 | Cho et al. |
| 11,567,289 | B2 | 1/2023 | Ichihashi |
| 2017/0131118 | A1 | 5/2017 | Kauhaniemi et al. |
| 2017/0212607 | A1 | 7/2017 | Yoon |
| 2018/0164852 | A1* | 6/2018 | Lim ..................... H04M 1/0214 |
| 2020/0323089 | A1 | 10/2020 | Rothkopf et al. |
| 2021/0116959 | A1 | 4/2021 | Heo et al. |
| 2022/0174198 | A1 | 6/2022 | Wang et al. |

FOREIGN PATENT DOCUMENTS

| | | | |
|---|---|---|---|
| JP | 2012083313 | A | 4/2012 |
| JP | 2015119470 | A | 6/2015 |
| JP | 2017228109 | A | 12/2017 |
| JP | 7218254 | B2 | 1/2023 |
| KR | 20070048504 | A | 5/2007 |
| KR | 20150041718 | A | 4/2015 |
| KR | 101602368 | B1 | 3/2016 |
| KR | 20170031525 | A | 3/2017 |
| KR | 20170089664 | A | 8/2017 |
| KR | 20200007510 | A | 1/2020 |
| KR | 20200030640 | A | 3/2020 |
| KR | 20200126315 | A | 11/2020 |
| KR | 20210015468 | A | 2/2021 |
| KR | 20220079104 | A | 6/2022 |
| WO | 2007013376 | A1 | 2/2007 |
| WO | 2020/200089 | | 10/2020 |
| WO | WO-2021172602 | A1 * | 9/2021 .......... H04M 1/0268 |

OTHER PUBLICATIONS

International Search Report for PCT/KR2022/001682 mailed May 13, 2022, 3 pages.
Written Opinion of the ISA for PCT/KR2022/001682 mailed May 13, 2022, 4 pages.
Office Action dated Jul. 24, 2025 in Korean Patent application No. 10-2021-0026629 and English-language translation.
English-language translation of KR20220079104.

* cited by examiner

1755 d1

1710

ELECTRONIC DEVICE COMPRISING FLEXIBLE DISPLAY AND METHOD FOR DETECTING STATE OF ELECTRONIC DEVICE

CROSS REFERENCE TO RELATED APPLICATIONS

This application is a continuation of International Application No. PCT/KR2022/001682 designating the United States, filed on Feb. 3, 2022, in the Korean Intellectual Property Receiving Office and claiming priority to Korean Patent Application No. 10-2021-0026629, filed on Feb. 26, 2021, in the Korean Intellectual Property Office, the disclosures of each of which are incorporated by reference herein in their entireties.

BACKGROUND

Field

The disclosure relates to an electronic device including a flexible display and a method for detecting a state of the electronic device.

Description of Related Art

With the development of display technology, electronic devices employing flexible displays, such as foldable electronic devices and rollable electronic devices, have been widely used. A flexible display may include a folding region, at least a portion of which is deformable to be curved or flat. As the form or structure of at least part of an electronic device employing the flexible display changes, an exposed area of the display may vary, and the electronic device may provide screens having various sizes to a user.

SUMMARY

Embodiments of the disclosure provide an electronic device for reducing the intensity of magnetic flux in comparison with an operating range, the electronic device including a magnet having, on one side thereof, a first pole (e.g., an S pole) and a second pole (e.g., an N pole) exhibiting opposite polarities, in which a maximum value and a minimum value of at least one directional component of magnetic flux density have a positive value and a negative value, respectively.

Embodiments of the disclosure provide an electronic device for precisely and accurately detecting a state of the electronic device using at least two directional components of magnetic flux density.

Embodiments of the disclosure provide an electronic device for sensing and correcting an influence (e.g., noise) of an external magnetic field using one directional component of magnetic flux density.

An electronic device according to an example embodiment includes a first housing, a second housing fastened to the first housing so as to be movable relative to the first housing, a flexible display disposed on at least a portion of the first housing and at least a portion of the second housing, a magnet having at least two polarities arranged in a first direction on a flat surface thereof, a sensor configured to move in the first direction along a central axis of the magnet over the magnet and detect at least two directional components including a first directional component and a second directional component of magnetic flux density as an arrangement of the second housing relative to the first housing is changed, a memory that stores state reference information about a state of the electronic device corresponding to the first directional component and the second directional component of the magnetic flux density, and a processor operationally connected with the sensor and the memory. The processor is configured to obtain magnetic detection data including the at least two directional components of the magnetic flux density from the sensor and detect a state of the electronic device, based on the obtained magnetic detection data and the state reference information.

According to an example embodiment, a method for detecting a state of an electronic device that includes a magnet having at least two polarities arranged in a first direction on a flat surface thereof and a sensor configured to move in the first direction along a central axis of the magnet includes obtaining magnetic detection data by detecting, through the sensor, at least two directional components including a first directional component and a second directional component of magnetic flux density and detecting a state of the electronic device, based on the obtained magnetic detection data and state reference information about a state of the electronic device corresponding to the first directional component and the second directional component of the magnetic flux density.

According to the example embodiments, the electronic device may include the magnet having, on one side thereof, a first pole (e.g., an S pole) and a second pole (e.g., an N pole) exhibiting opposite polarities. The maximum value and the minimum value of at least one directional component of magnetic flux density may have a positive value and a negative value, respectively, and the intensity of magnetic flux may be reduced in comparison with an operating range.

Furthermore, according to the example embodiments, the electronic device may, for example, precisely and accurately detect a state of the electronic device using at least two directional components of magnetic flux density.

Moreover, according to the example embodiments, the electronic device may, for example, sense and correct an influence (e.g., noise) by an external magnetic field using one directional component of magnetic flux density.

In addition, the disclosure may provide various effects that are directly or indirectly recognized.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of the drawings, identical or similar reference numerals may be used to refer to identical or similar components.

DETAILED DESCRIPTION

Hereinafter, various embodiments of the disclosure will be described with reference to accompanying drawings. Accordingly, those of ordinary skill in the art will recognize that modifications, equivalents, and/or alternatives of the various embodiments described herein can be variously made without departing from the scope and spirit of the disclosure.

Figure 1:
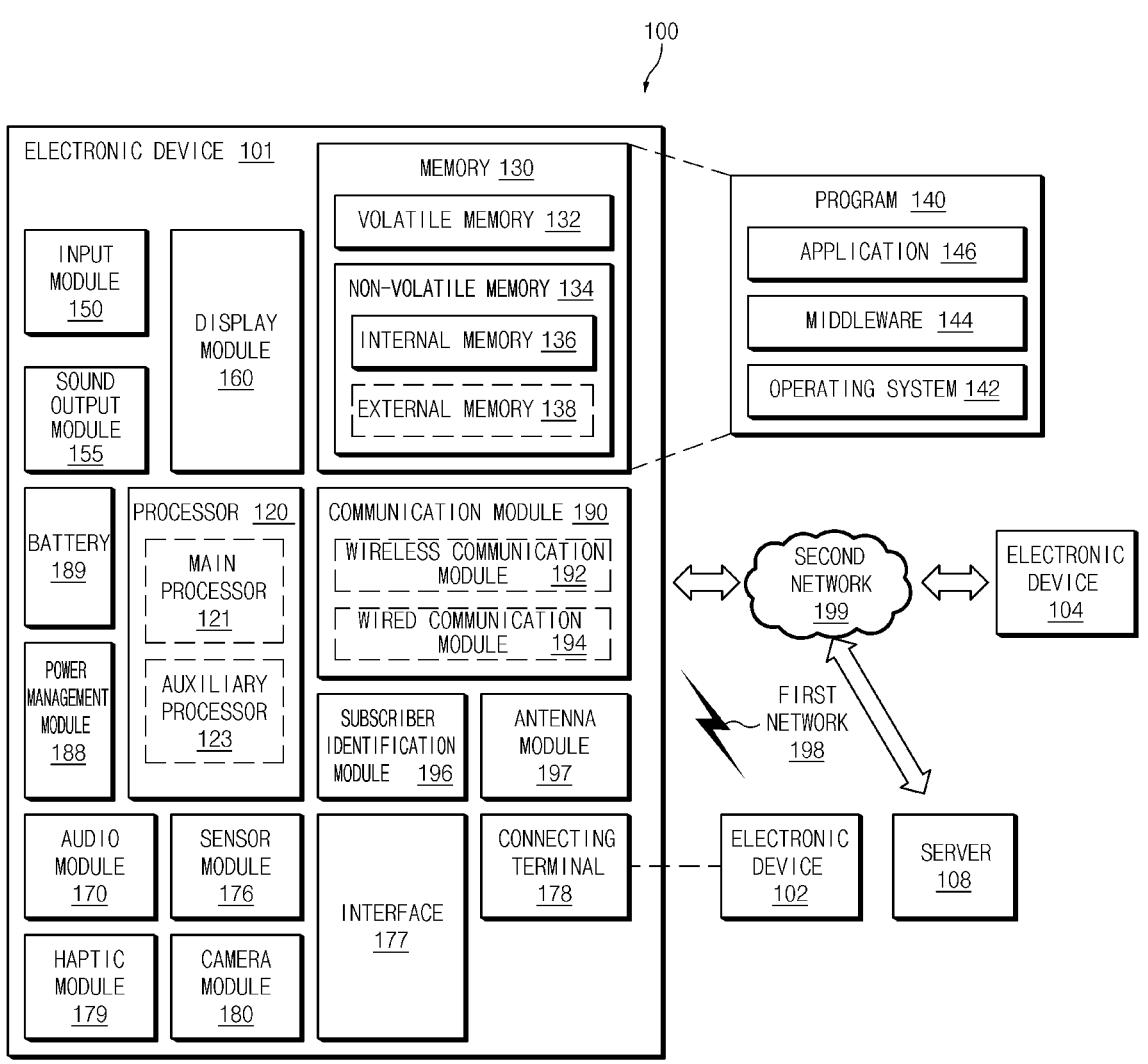
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
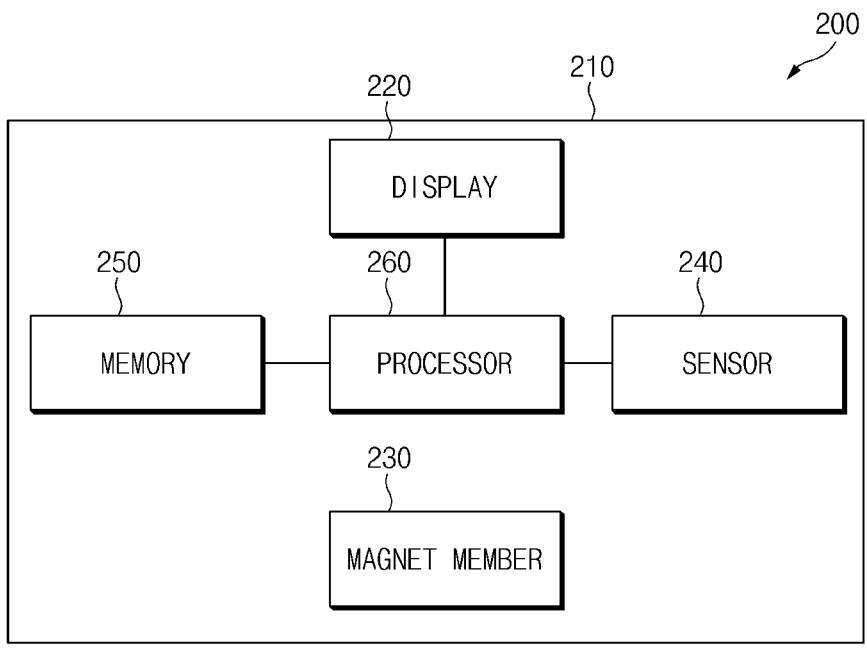
FIG. 2 is a block diagram illustrating an example electronic device according to various embodiments.

FIG. 2 is a block diagram illustrating an example electronic device 200 according to an embodiment. The electronic device 200 according to an embodiment (e.g., the electronic device 101 of FIG. 1) may include a housing 210, a display 220, a magnet member 230, a sensor 240, a memory 250, and a processor 260.

According to an embodiment, the housing 210 may surround the components included in the electronic device 200 and may form an exterior of the electronic device 200. The housing 210 may include a first housing (e.g., a first housing 510 of FIG. 5 or a first housing 1810 of FIG. 18) and a second housing (e.g., a second housing 520 of FIG. 5 or a second housing 1840 of FIG. 18) fastened to the first housing so as to be movable relative to the first housing. A state of the electronic device 200 may be determined by an arrangement of the first housing and the second housing. For example, the first housing (e.g., the first housing 510 of FIG. 5) and the second housing (e.g., the second housing 520 of FIG. 5) may be connected through a hinge structure and may be unfolded or folded. In another example, the second housing (e.g., the second housing 1840 of FIG. 18) may be fastened to the first housing (e.g., the first housing 1810 of FIG. 18) so as to slide relative to the first housing (e.g., the first housing 1810 of FIG. 18).

According to an embodiment, the display 220 may be disposed on at least a portion of the housing 210. The display 220 may, for example, be a flexible display, at least a portion of which is able to be bent or rolled.

According to an embodiment, the magnet member 230 (including, e.g., a magnet) may include at least two polarities arranged in a first direction (e.g., a first direction x of FIG. 3A) on a flat surface thereof. According to an embodiment, the magnet member 230 may include at least two polarities arranged in the first direction on one side of the magnet member 230. A first pole (an S pole) and a second pole (an N pole) may be magnetized on the one side of the magnet member 230. The first pole (the S pole) and the second pole (the N pole) may be arranged in the first direction on the one side of the magnet member 230. According to an embodiment, the magnet member 230 may include first magnet members representing first poles and second magnet members representing second poles. The first magnet members and the second magnet members may be alternately disposed.

According to an embodiment, the sensor 240 may be a magnetic sensor (e.g., a Hall sensor). The sensor 240 may detect at least two directional components of magnetic flux density. For example, the sensor 240 may detect a first directional component (e.g., an x-component), a second directional component (e.g., a z-component), and a third component (e.g., a y-component) of the magnetic flux density. As the electronic device 200 experiences a change of state, the sensor 240 may move in the first direction along the central axis of the magnet member 230 from a position spaced apart from the magnet member 230 by a specified distance in a second direction (e.g., a second direction z of FIG. 3A). The sensor 240 may generate magnetic detection data for the detected magnetic flux density and may transfer the magnetic detection data to the processor 260.

According to an embodiment, the memory 250 (e.g., the memory 130 of FIG. 1) may store at least one program, at least one application, data, or instructions executed by the processor 260. According to an embodiment, the memory 250 may include information or instructions that cause at least some of the operations of the electronic device, which will be described below, to be performed. According to an embodiment, the memory 250 may include instructions related to a plurality of applications executed by the processor 260.

According to an embodiment, the memory 250 may store state reference information about a state of the electronic device 200 that corresponds to the first directional component and the second directional component of the magnetic flux density. For example, the electronic device 200 may be a foldable electronic device, and the memory 250 may store state reference information including information about a folding angle of the electronic device 200 depending on the first directional component and the second directional component of the magnetic flux density. Hereinafter, the folding angle may refer to the angle between the first housing (e.g., the first housing 510 of FIG. 5) and the second housing (e.g., the second housing 520 of FIG. 5) or the angle between one region (e.g., a first region 561 of a display of FIG. 5) and an opposite region (e.g., a second region 562 of the display of FIG. 5) with respect to a folding region of the display (e.g., a folding region 563 of FIG. 5). In another example, the electronic device 200 may be a rollable or slidable electronic device, and the memory 250 may store state reference information including information about the degree of extension of the electronic device 200 depending on the first directional component and the second directional component of the magnetic flux density.

According to an embodiment, the state reference information may include a plurality of sections divided based on a first value and a second value of the second directional component of the magnetic flux density. The plurality of sections of the state reference information may include at least one effective section of the second directional component in which the second directional component of the magnetic flux density is greater than or equal to the first value and less than or equal to the second value and at least one effective section of the first directional component in which the second directional component of the magnetic flux density is less than the first value or exceeds the second value. For example, the effective section of the second directional component may include a first section in which the second directional component and the first directional component have negative values, a second section in which the first directional component is saturated as a positive value, and a third section in which the second directional component has a positive value and the first directional component has a negative value. The effective section of the first directional component may include a fourth section in which the second directional component is less than the first value and a fifth section in which the second directional component exceeds the second value. For example, the first value may be a value corresponding to 90% of a minimum value of the second directional component of the magnetic flux density, and the second value may be a value corresponding to 90% of a maximum value of the second directional component of the magnetic flux density. The state reference information may include the third directional component of the magnetic flux density maintained at a constant value when the electronic device 200 experiences a change of state.

According to an embodiment, the processor 260 may be operationally connected with the display 220, the sensor 240, and the memory 250. The processor 260 may execute a program stored in the memory 250 (e.g., the program 140 of FIG. 1) to control at least one other component (e.g., a hardware or software component) and perform various data processing or computation.

According to an embodiment, the processor 260 may obtain the magnetic detection data from the sensor 240. The processor 260 may detect a state of the electronic device 200, based on the obtained magnetic detection data and/or the state reference information stored in the memory 250. For example, the electronic device 200 may be a foldable electronic device, and the processor 260 may detect a folding angle of the electronic device 200, based on the obtained magnetic detection data and/or the state reference information stored in the memory 250. In another example, the electronic device 200 may be a rollable or slidable electronic device, and the processor 260 may detect the degree of extension of the electronic device 200, based on the obtained magnetic detection data and/or the state reference information stored in the memory 250.

According to an embodiment, the processor 260 may detect a state of the electronic device 200 using the second directional component of the magnetic flux density and the state reference information, based on the detected second directional component of the magnetic flux density being greater than or equal to the first value and less than or equal to the second value. The processor 260 may detect a state of the electronic device 200 using the first directional component of the magnetic flux density and the state reference information, based on the detected second directional component of the magnetic flux density being less than the first value and exceeding the second value. The processor 260 may select one section from the plurality of sections of the state reference information stored in the memory 250, based on at least one of the first directional component, the sign of the first directional component, the second directional component, or the sign of the second directional component of the magnetic flux density included in the magnetic detection data. In the selected section, the processor 260 may detect a state of the electronic device 200 using one of the first directional component and the second directional component of the magnetic flux density. In the selected section, the processor 260 may detect a state of the electronic device 200 corresponding to the second directional component of the magnetic flux density, based on the selected section being the first section, the second section, or the third section that is an effective section of the second directional component. In the selected section, the processor 260 may detect a state of the electronic device 200 corresponding to the first directional component of the magnetic flux density, based on the selected section being the fourth section or the fifth section that is an effective section of the first directional component. The processor 260 may provide various user interfaces to a user, based on the detected state of the electronic device 200.

According to an embodiment, the processor 260 may detect noise caused by an external magnetic field, based on the third directional component of the magnetic flux density included in the magnetic detection data. When there is no influence caused by the external magnetic field, the third directional component of the magnetic flux density may be maintained at a constant value even though the electronic device 200 experiences a change of state. When the displacement of the third directional component of the magnetic flux density is greater than or equal to a specified value, the processor 260 may determine that noise caused by the external magnetic field exists and may correct the first directional component and the second directional component based on the third directional component of the magnetic flux density.

According to an embodiment, the processor 260 may update the stored state reference information by generating state reference information or measuring magnetic flux density depending on a state. For example, when a change of a magnetic field greater than or equal to a specified value is sensed through the sensor 240, the processor 260 may update the stored state reference information by measuring magnetic flux density depending on a state of the electronic device 200, or may replace the stored state reference information by generating new state reference information. The processor 260 may control an operation of the electronic device 200 such that the electronic device 200 is changed from a first state (e.g., a folded state or a retracted state) to a second state (e.g., an unfolded state or an extended state). For example, the processor 260 may provide, through the display 220, a user interface that induces the user to change the electronic device 200 from the first state to the second state through a user operation. In another example, the processor 260 may control the electronic device 200 such that the electronic device is changed from the first state to the second state by a mechanical operation. The processor 260 may detect the first directional component and the second directional component of the magnetic flux density using the sensor 240 while the electronic device 200 is changed from the first state to the second state. The processor 260 may extract the maximum value and the minimum value of the second directional component of the magnetic flux density. The processor 260 may set a plurality of sections based on the maximum value and the minimum value of the second directional component of the magnetic flux density. For example, the processor 260 may set a plurality of sections divided with respect to points where the second directional component of the magnetic flux density corresponds to the first value (e.g., a value of 90% of the minimum value of the second directional component of the magnetic flux density) or the second value (e.g., a value of 90% of the maximum value of the second directional component of the magnetic flux density).

Figure 3A:
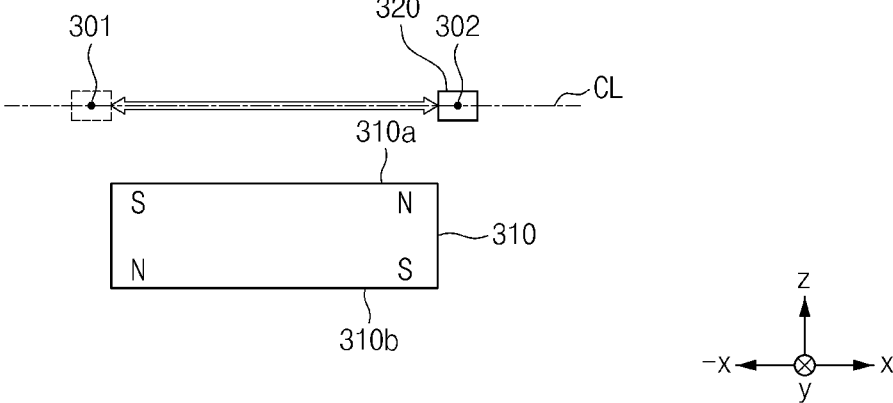
FIG. 3A is a view illustrating a positional relationship between a magnet member and a sensor included in an example electronic device according to various embodiments.
Figure 3B:
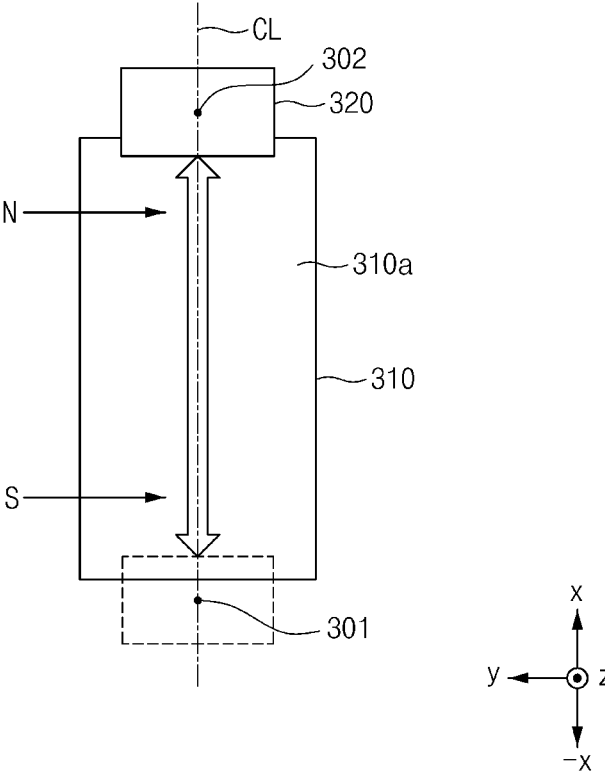
FIG. 3B is a plan view illustrating a magnet member and a sensor included in an example electronic device according to various embodiments.

Hereinafter, a magnet member 310 (e.g., the magnet member 230 of FIG. 2) and a sensor 320 (e.g., the sensor 240 of FIG. 2) included in an electronic device according to various embodiments (e.g., the electronic device 200 of FIG. 2) will be described with reference to FIGS. 3A and 3B. FIG. 3A is a view illustrating a positional relationship between the magnet member 310 and the sensor 320 included in an example electronic device according to various embodiments. FIG. 3B is a plan view illustrating the magnet member 310 and the sensor 320 included in an example electronic device according to various embodiments.

According to an embodiment, the magnet member 310 may include a first surface 310a and a second surface 310b facing each other in the second direction z. The magnet member 310 may be a single-sided multi-pole magnet having a first pole S and a second pole N magnetized on one surface thereof. The magnet member 310 may include the first pole S and the second pole N arranged in the first direction x on the first surface 310a. The first pole S and the second pole N may be magnetized and located on a flat surface. The magnet member 310 may include polarities opposite to the polarities of the first surface 310a in the second direction z on the second surface 310b. For example, the magnet member 310 may include a second pole N and a first pole S arranged in the first direction x on the second surface 310b.

According to an embodiment, as the electronic device is changed from a first state (e.g., a folded state or a retracted state) to a second state (e.g., an unfolded state or an extended state), the sensor 320 may be aligned with a central axis CL of the magnet member 310 over the first surface 310a of the magnet member 310 and may move in the first direction x (or, in the direction opposite to the first direction). In the electronic device in the first state, the sensor 320 may be located at a first position 301 overlapping one end portion of the magnet member 310 in the second direction z. In the electronic device in the second state, the sensor 320 may be located at a second position 302 overlapping one end portion of the magnet member 310 in the second direction z. The sensor 320 may move from the first position 301 to the second position 302 as the electronic device is changed from the first state to the second state. FIGS. 3A and 3B illustrate one example of the relative positions of the magnet member 310 and the sensor 320. According to an embodiment, the magnet member 310 may move, and the sensor 320 may move over the moving magnet member 310 so as to be aligned with the central axis CL of the magnet member 310. According to an embodiment, the sensor 320 may be fixed in one region, and the magnet member 310 may move relative to the sensor 320 in the first direction x (or, in the direction opposite to the first direction).

According to an embodiment, the sensor 320 may detect a first directional (x) component, a second directional (z) component, and a third directional (y) component of magnetic flux density. The first directional (x) component and the second directional (z) component of the magnetic flux density may vary depending on the position of the sensor 320 relative to the magnet member 310. According to an embodiment, the third directional (y) component of the magnetic flux density may have a constant value even though the sensor 320 moves so as to be aligned with the central axis CL of the magnet member 310 and a state of the electronic device or the position of the sensor 320 relative to the magnet member 310 is changed accordingly.

Figure 4:
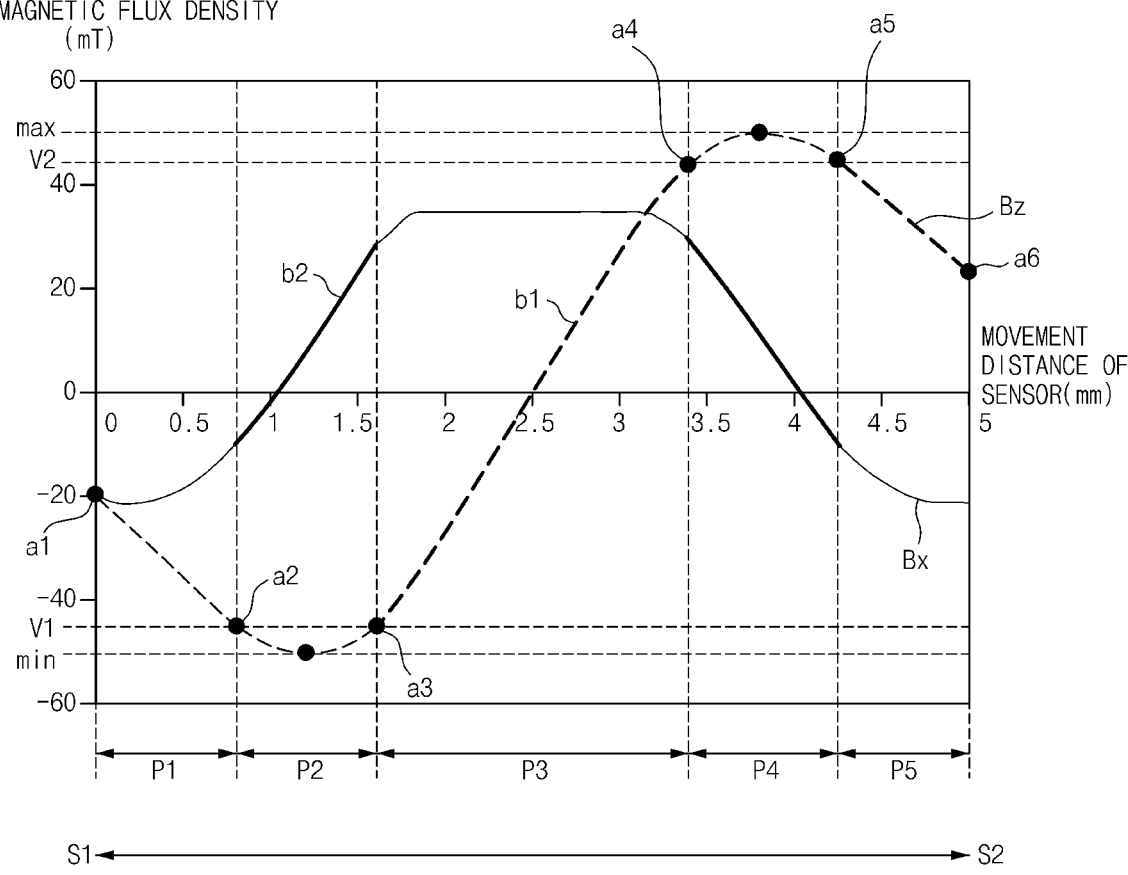
FIG. 4 is a graph depicting a first directional component and a second directional component of magnetic flux density detected by a sensor depending on a movement distance of the sensor relative to a magnet member in an electronic device according to various embodiments.

FIG. 4 is a graph depicting a first directional component and a second directional component of magnetic flux density (the vertical axis) detected by a sensor depending on a movement distance (the horizontal axis) of the sensor relative to a magnet member in an example electronic device according to various embodiments (e.g., the electronic device 200 of FIG. 2). As the electronic device is changed from a first state S1 (e.g., a folded state or a retracted state) to a second state S2 (e.g., an unfolded state or an extended state), the movement distance of the sensor relative to the magnet member (or, one point of the magnet member) may be gradually increased. Referring to FIG. 4, a first line Bz represents the second directional component of the magnetic flux density depending on the movement distance of the sensor, and a second line Bx represents the first directional component of the magnetic flux density depending on the movement distance of the sensor.

State reference information stored in a memory of the electronic device according to an embodiment may, for example, include graph information of FIG. 4, or may be generated based on the graph information of FIG. 4. The first line Bz may include a minimum value min and a maximum value max. In various embodiments, the first line Bz may include only one of the minimum value min and the maximum value max. The minimum value min may have a negative value, and the maximum value max may have a positive value. The state reference information may include a plurality of sections P1, P2, P3, P4, and P5 divided based on a first value V1 and a second value V2 of the first line Bz. The first value V1 may be, for example, a value corresponding to 90% of the minimum value min of the first line Bz. The second value V2 may be, for example, a value corresponding to 90% of the maximum value max of the first line Bz. The electronic device may set the plurality of sections P1, P2, P3, P4, and P5 by extracting a first point a1 that is a second directional component value in the first state, a second point a2 and a third point a3 at which the second directional component has the first value V1, a fourth point a4 and a fifth point a5 at which the second directional component has the second value V2, and a sixth point a6 that is a second directional component value in the second state.

In an embodiment, the plurality of sections of the state reference information may include one or more effective sections P1, P3, and P5 of the second directional component in which the second directional component of the magnetic flux density is greater than or equal to the first value V1 and less than or equal to the second value V2 and one or more effective sections P2 and P4 of the first directional component in which the second directional component of the magnetic flux density is less than the first value V1 or exceeds the second value V2. The effective sections P1, P3, and P5 of the second directional component spaced apart from each other may be specified (or, divided) based on characteristics of the first directional component.

The one or more effective sections P1, P3, and P5 of the second directional component may include the first section P1 in which the second directional component and the first directional component have negative values, the second section P3 in which the first directional component is saturated as a positive value, and the third section P5 in which the second directional component has a positive value and the first directional component has a negative value. The first section P1 may correspond to the section from the first point a1 to the second point a2, the second section P3 may correspond to the section from the third point a3 to the fourth point a4, and the third section P5 may correspond to the section from the fifth point a5 to the sixth point a6. The one or more effective sections P2 and P4 of the first directional component may include the fourth section P2 in which the second directional component is less than the first value V1 and the fifth section P4 in which the second directional component exceeds the second value V2. In the fourth section P2, the second directional component may have a negative value, and in the fifth section P4, the second directional component may have a positive value.

When a section corresponding to a first directional component and a second directional component of magnetic flux density included in obtained magnetic detection data is the first section P1 and the second directional component corresponds to the value of the first point a1, the electronic device according to an embodiment may determine that the electronic device is in the first state and may perform an operation depending on the first state. When the section corresponding to the first directional component and the second directional component of the magnetic flux density included in the obtained magnetic detection data is the third section P5 and the second directional component corresponds to the value of the sixth point a6, the electronic device may determine that the electronic device is in the second state and may perform an operation depending on the second state. When the section corresponding to the first directional component and the second directional component of the magnetic flux density included in the obtained magnetic detection data is the first section P1, the electronic device may perform an operation corresponding to a mode in which the electronic device starts to be changed from the first state to the second state. When the section corresponding to the first directional component and the second directional component of the magnetic flux density included in the obtained magnetic detection data is the second section P3, the electronic device may perform a flex mode operation in which a plurality of regions of a display are separately operated and multitasking is possible accordingly. When the section corresponding to the first directional component and the second directional component of the magnetic flux density included in the obtained magnetic detection data is the third section P5, the electronic device may perform an operation corresponding to a mode in which the electronic device starts to be changed from the second state to the first state. When the section corresponding to the first directional component and the second directional component of the magnetic flux density included in the obtained magnetic detection data is the fourth section P2 or the fifth section P4, the electronic device may perform an operation corresponding to a hysteresis mode using the first directional component of the magnetic flux density, based on the negative minimum value min and the positive maximum value max of the second directional component of the magnetic flux density.

According to an embodiment, the slope b1 of the first line Bz in the second section P3 may be substantially the same as the slope b2 of the second line Bx in the fourth section P2. According to an embodiment, because the first directional component is saturated in the second section P3 among the effective sections P1, P3, and P5 of the second directional component and the slope b1 of the first line Bz in the second section P3 is substantially the same as the slope b2 of the second line Bx in the fourth section P2, a state of the electronic device may be easily detected using the first directional component or the second directional component in each section, and accuracy may be improved. In addition, because the maximum value max of the second directional component of the magnetic flux density has a positive value and the minimum value min has a negative value, the same operating range (e.g., the difference between the maximum value and the minimum value of the second directional component) may be obtained with small magnetic flux intensity as compared with when both the maximum value and the minimum value have positive values or negative values.

Figure 5:
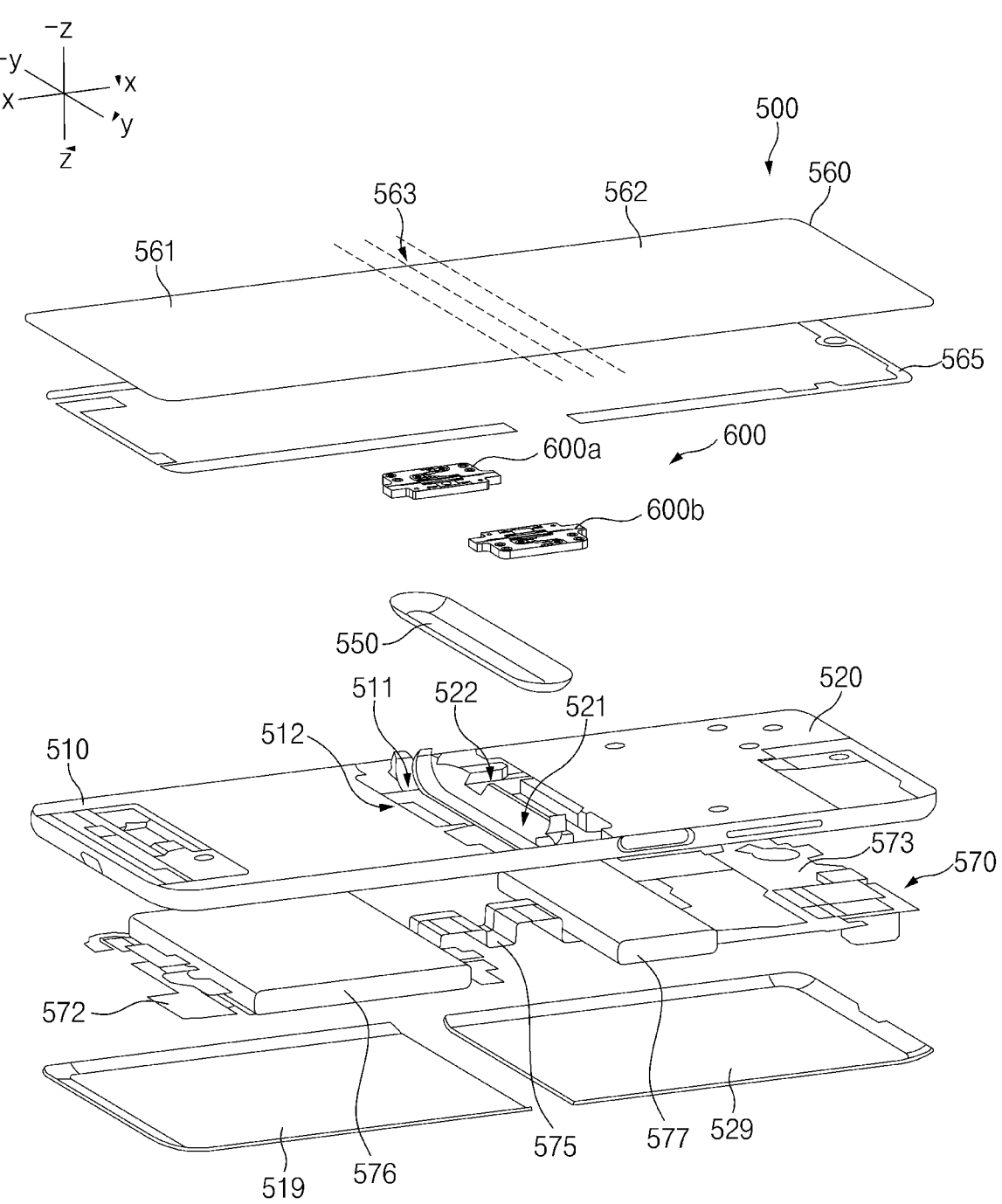
FIG. 5 is an exploded perspective view of an example electronic device in a second state according to various embodiments.
Figure 6:
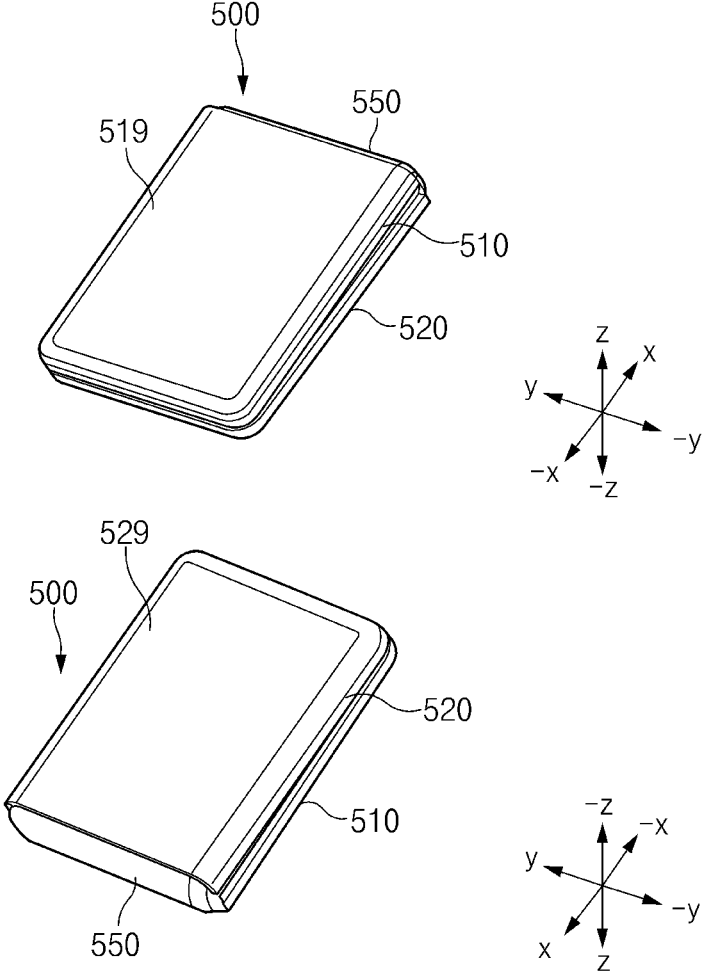
FIG. 6 is a perspective view of an example electronic device in a first state according to various embodiments.

An electronic device 500 according to various embodiments will be described with reference to FIGS. 5 and 6. The electronic device 500 according to an embodiment (e.g., the electronic device 200 of FIG. 2) may be a foldable electronic device. FIG. 5 is an exploded perspective view of the electronic device in a second state (e.g., a flat state, an unfolded state, or an open state) according to various embodiments. FIG. 6 is a perspective view of the electronic device 500 (e.g., the electronic device 200 of FIG. 2) in a first state (e.g., a folded state or a closed state) according to various embodiments.

The electronic device 500 according to an embodiment may include the first housing 510, the second housing 520, the display 560 (e.g., a flexible display), a hinge structure 600, a hinge housing 550 disposed to surround the hinge structure 600, various electronic components 570 (e.g., a battery, a printed circuit board, a camera, at least one sensor, communication circuitry, and an antenna) related to operations of the electronic device 500, a first cover 519 that covers at least a portion of one surface (e.g., a surface facing in the z-axis direction) of the first housing 510, and a second cover 529 that covers one surface (e.g., a surface facing in the z-axis direction) of the second housing 520.

According to an embodiment, depending on an arrangement, the first housing 510 may be disposed to be continuous with the second housing 520 in the x-axis direction, or may be disposed side by side with the second housing 520 in the x-axis direction. Alternatively, when the folding region 563 of the display 560 is folded, one surface (e.g., a surface facing in the −z-axis direction in FIG. 5) of the first housing 510 may be disposed to face one surface (e.g., a surface facing in the −z-axis direction in FIG. 5) of the second housing 520.

According to an embodiment, for example, at least a portion of the first housing 510 may be formed of or include a metallic material, or at least a portion of the first housing 510 may be formed of or include a non-metallic material. For example, the first housing 510 may be formed of a material having a predetermined rigidity to support at least a portion of the display 560. One region of the display 560 (e.g., the first region 561 and a portion of the folding region 563) may be disposed on at least a portion of a front surface (e.g., the surface facing in the −z-axis direction in FIG. 5) of the first housing 510. At least a portion of the first housing 510 may be attached with one region of the display 560 (e.g., the first region 561 and at least a portion of part of the folding region 563) through an adhesive means, an adhesive member, or an adhesive tape. According to various embodiments, at least a portion of the first housing 510 may be attached with a lattice structure or a support structure disposed under one region of the display 560. Alternatively, at least a portion of the periphery of the front surface of the first housing 510 may be attached with at least a portion of the periphery of one region of the display 560 (e.g., the first region 561 and a portion of the folding region 563). In another case, one side of an upper portion of the front surface of the first housing 510 may be attached with one side of the first region 561 of the display 560. In this regard, at least a portion of an adhesive layer 565 (or, an adhesive means, an adhesive member, or an adhesive tape) may be at least partially disposed between the first housing 510 and the first region 561 of the display 560. At least a portion of the inside of the first housing 510 may be provided in a hollow form or may be coupled with the first cover 519 to form a hollow, and the electronic components 570 required for driving the electronic device 500 may be disposed in the hollow.

According to an embodiment, edges of the first housing 510 (e.g., the remaining three edges other than the edge facing the second housing 520) may protrude above a bottom surface of a central portion of the housing by a specified height to surround at least the periphery of one side of the display 560. Alternatively, sidewalls may be disposed on at least one of the edges of the first housing 510 to at least partially face the periphery of the display 560. The sidewalls formed on at least some of the edges of the first housing 510 may have a specified height at the remaining three edges other than the edge facing the second housing 520. An edge portion of the first housing 510 that faces the second housing 520 may include a depression 511, at least a portion of which has a predetermined curvature such that at least a portion of the hinge housing 550 is disposed in the depression 511. The first housing 510 may include, on the edge portion facing the second housing 520, a first step 512 on which a portion of the hinge structure 600 mounted in the hinge housing 550 is seated.

According to an embodiment, depending on an arrangement, the second housing 520 may be disposed side by side with the first housing 510, or may be disposed such that at least one surface thereof faces one surface of the first housing 510 (e.g., the surface on which the display 560 is disposed). The second housing 520 may be formed of the same material as that of the first housing 510. The second housing 520 may be disposed to be symmetrical to the first housing 510 in a left/right direction or an up/down direction, and at least a portion of the remaining region of the display 560 (e.g., the second region 562 of the display 560 and an opposite side of the folding region 563 thereof) other than the region disposed on the first housing 510 may be disposed on a front surface of the second housing 520. At least a portion of the second housing 520 may be attached with the second region 562 of the display 560 and at least a portion of the opposite side of the folding region 563 of the display 560. Alternatively, the periphery of the front surface of the second housing 520 may be attached with the second region 562 of the display 560 and at least a portion of the opposite side of the folding region 563 of the display 560. In another case, one side of a lower portion of the front surface (e.g., the surface facing in the −z-axis direction in FIG. 5) of the second housing 520 may be attached with one side of the second region 562 of the display 560. In this regard, at least a portion of the adhesive layer 565 (e.g., an adhesive means, an adhesive member, or an adhesive tape) may be at least partially disposed between the second housing 520 and the second region 562 of the display 560. Similarly to the first housing 510, at least a portion of the inside of the second housing 520 may be provided in a hollow form or may be coupled with the second cover 529 to form a hollow, and the electronic components 570 required for driving the electronic device 500 may be disposed in the hollow.

According to an embodiment, edges of the second housing 520 (e.g., the remaining three edges other than the edge facing the first housing 510) may protrude above a bottom surface of a central portion of the second housing 520 by a specified height to surround the periphery of an opposite side of the display 560. Alternatively, similarly to the sidewalls formed on the first housing 520, sidewalls may be disposed on at least one of the edges of the second housing 520 to at least partially face the periphery of the display 560. The sidewalls formed on at least some of the edges of the second housing 520 may have a specified height at the remaining three edges other than the edge facing the first housing 510.

According to an embodiment, a portion of the second housing 520 that faces the first housing 510 may include a depression 521, at least a portion of which has a predetermined curvature such that the hinge housing 550 is disposed in the depression 521. The second housing 520 may include, on an edge portion facing the first housing 510, a second step 522 on which a portion of the hinge structure 600 mounted in the hinge housing 550 is seated.

According to an embodiment, depending on a folded or unfolded state of the electronic device 500, the hinge housing 550 may be hidden by one side of the first housing 510 and one side of the second housing 520 (e.g., the unfolded state), or may be exposed to the outside (e.g., the folded state). For example, when the first housing 510 and the second housing 520 are disposed side by side as illustrated in FIG. 5, at least a portion of the hinge housing 550 may be hidden by the first housing 510 and the second housing 520. When one surface of the first housing 510 and one surface of the second housing 520 face each other as illustrated in FIG. 6, at least a portion of the hinge housing 550 may be exposed to the outside from between one edge of the first housing 510 and one edge of the second housing 520 (e.g., the edges of the first housing 510 and the second housing 520 that face each other in the unfolded state).

According to an embodiment, at least a portion of the display 560 may be flexible. The display 560 may include the first region 561 disposed on the first housing 510, the second region 562 disposed on the second housing 520, and the folding region 563 disposed on the region to which the first housing 510 and the second housing 520 are adjacent. The folding region 563 of the display 560 may extend in one direction (e.g., the y-axis direction) and may be folded or unfolded depending on an operation of the hinge structure 600. According to various embodiments, the entire display 560 may have flexibility. The folding region 563 of the display 560 may be disposed so as not to be attached with the first housing 510 and the second housing 520. For example, the folding region 563 of the display 560 may be spaced apart from the front surfaces (e.g., the surfaces facing in the −z-axis direction in FIG. 5) of the first housing 510 and the second housing 520 at a predetermined interval. Alternatively, a predetermined gap may be formed between the folding region 563 of the display 560 and the first housing 510 and the second housing 520. The first region 561 of the display 560 may be attached with at least a portion of the first housing 510, and the second region 562 of the display 560 may be attached with at least a portion of the second housing 520. In this regard, one portion of the adhesive layer 565 may be disposed in at least a partial region between the display 560 and the first housing 510, and another portion of the adhesive layer 565 may be disposed in at least a partial region between the display 560 and the second housing 520. According to various embodiments, as illustrated, the adhesive layer 565 may be disposed only on the peripheries of the first housing 510 and the second housing 520.

According to an embodiment, the hinge structure 600 may be disposed inside the hinge housing 550. The hinge structure 600 may include a first hinge structure 600*a* and a second hinge structure 600*b* that are disposed to be symmetrical to each other in one direction (e.g., the y-axis direction). One side of the first hinge structure 600*a* and one side of the second hinge structure 600*b* may be connected to the first housing 510, and an opposite side of the first hinge structure 600*a* and an opposite side of the second hinge structure 600*b* may be connected to the second housing 520. The first hinge structure 600*a* and the second hinge structure 600*b* may perform a folding or unfolding operation depending on an external force. Although FIG. 5 illustrates an example that the electronic device 500 includes two hinge structures 600, the number of hinge structures 600 is not limited thereto.

According to an embodiment, the various electronic components 570 related to operations of the electronic device 500 may include a first printed circuit board 572 located between the first housing 510 and the first cover 519, a second printed circuit board 573 located between the second housing 520 and the second cover 529, at least one processor (not illustrated) (e.g., the processor 260 of FIG. 2) mounted on the first printed circuit board 572 or the second printed circuit board 573, a flexible printed circuit board 575 extending in a direction from the first housing 510 to the second housing 520 across the folding region 563 of the display 560 and electrically connecting at least one component (e.g., the first printed circuit board 572) on one side of the first housing 510 and at least one component (e.g., the second printed circuit board 573) on one side of the second housing 520, and batteries 576 and 577. At least a portion of the flexible printed circuit board 575 may be attached to the first housing 510 and/or the second housing 520.

Figure 7:
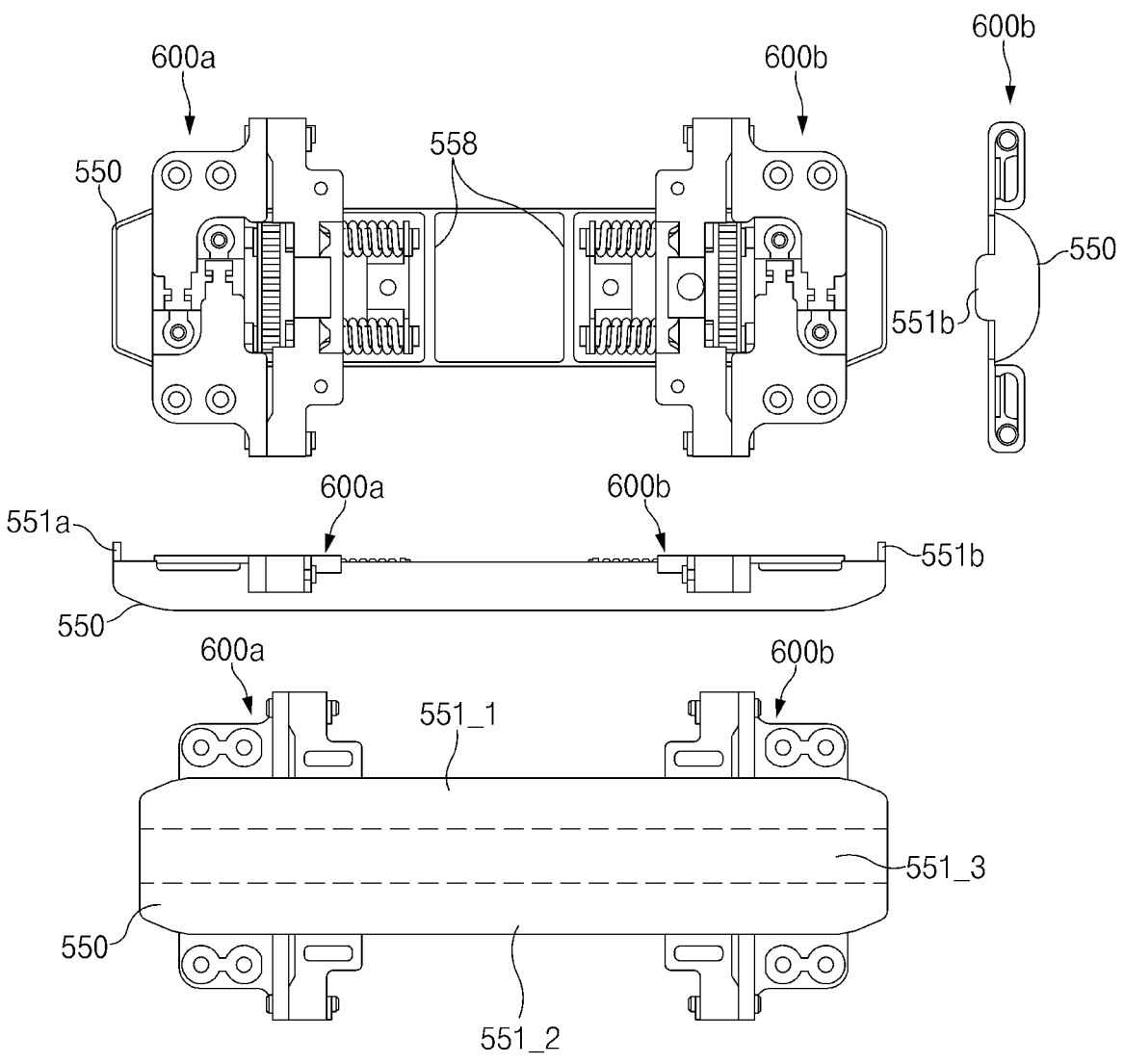
FIG. 7 is a view illustrating a hinge structure and a hinge housing of an example electronic device according to various embodiments.

FIG. 7 is a view illustrating the hinge structure and the hinge housing of an example electronic device (e.g., the electronic device 500 of FIG. 5) according to various embodiments. Referring to FIG. 7, the electronic device according to an embodiment may include a plurality of hinge structures 600*a* and 600*b*. A state in which the first hinge structure 600*a* and the second hinge structure 600*b* are disposed on the hinge housing 550 is illustrated in the drawing. However, the disclosure is not limited thereto, and three or more hinge structures may be disposed on the hinge housing 550 as needed.

According to an embodiment, the first hinge structure 600*a* may be disposed on one side of the hinge housing 550 (e.g., the left side based on the illustrated drawing). One side of the first hinge structure 600*a* may be coupled with the first housing 510, and an opposite side of the first hinge structure 600*a* may be coupled with the second housing 520. The first hinge structure 600*a* may perform a rotation operation within a specified range. The first hinge structure 600*a* may be disposed to be symmetrical to the second hinge structure 600*b* with respect to a central portion of the hinge housing 550.

According to an embodiment, the second hinge structure 600*b* may be disposed on an opposite side of the hinge housing 550 (e.g., the right side based on the illustrated drawing). One side of the second hinge structure 600*b* may be coupled with the first housing 510, and an opposite side of the second hinge structure 600*b* may be coupled with the second housing 520. The second hinge structure 600*b* may perform a rotation operation within a specified range. The second hinge structure 600*b* may be disposed to be symmetrical to the first hinge structure 600*a* with respect to the central portion of the hinge housing 550. The second hinge structure 600*b* may include the same structure and configuration as the first hinge structure 600*a*. However, the second hinge structure 600*b* may differ from the first hinge structure 600*a* in terms of the positions thereof.

According to an embodiment, the hinge housing 550 may have a semi-cylindrical shape with an empty space inside, or may have a vessel shape obtained by cutting a pipe having opposite closed ends in a lengthwise direction. The hinge housing 550 may include a flat bottom portion 551_3, and a first rib 551_1 and a second rib 551_2 that are formed on opposite sides of the bottom portion 551_3 and that have a predetermined curvature. The first rib 551_1 and the second rib 551_2 may be symmetrically disposed on the opposite sides of the bottom portion 551_3. The hinge housing 550 may have a gradually decreasing width from the center toward the left and right ends based on the illustrated drawing. The hinge housing 550 may include at least one partition wall 558 formed therein, and the partition wall 558 may divide an inner space of the hinge housing 550 into spaces. At least a portion of the first hinge structure 600*a* and at least a portion of the second hinge structure 600*b* may be seated in the spaces divided from each other. The hinge housing 550 may include, at the left and right ends thereof, screen walls 551*a* and 551*b* that further protrude upward beyond peripheral portions and prevent the inside of the hinge housing 550 from being visible from the outside. The hinge housing 550 may be formed of the same material as that of the first hinge structure 600*a* or the second hinge structure 600*b*.

Figure 8:
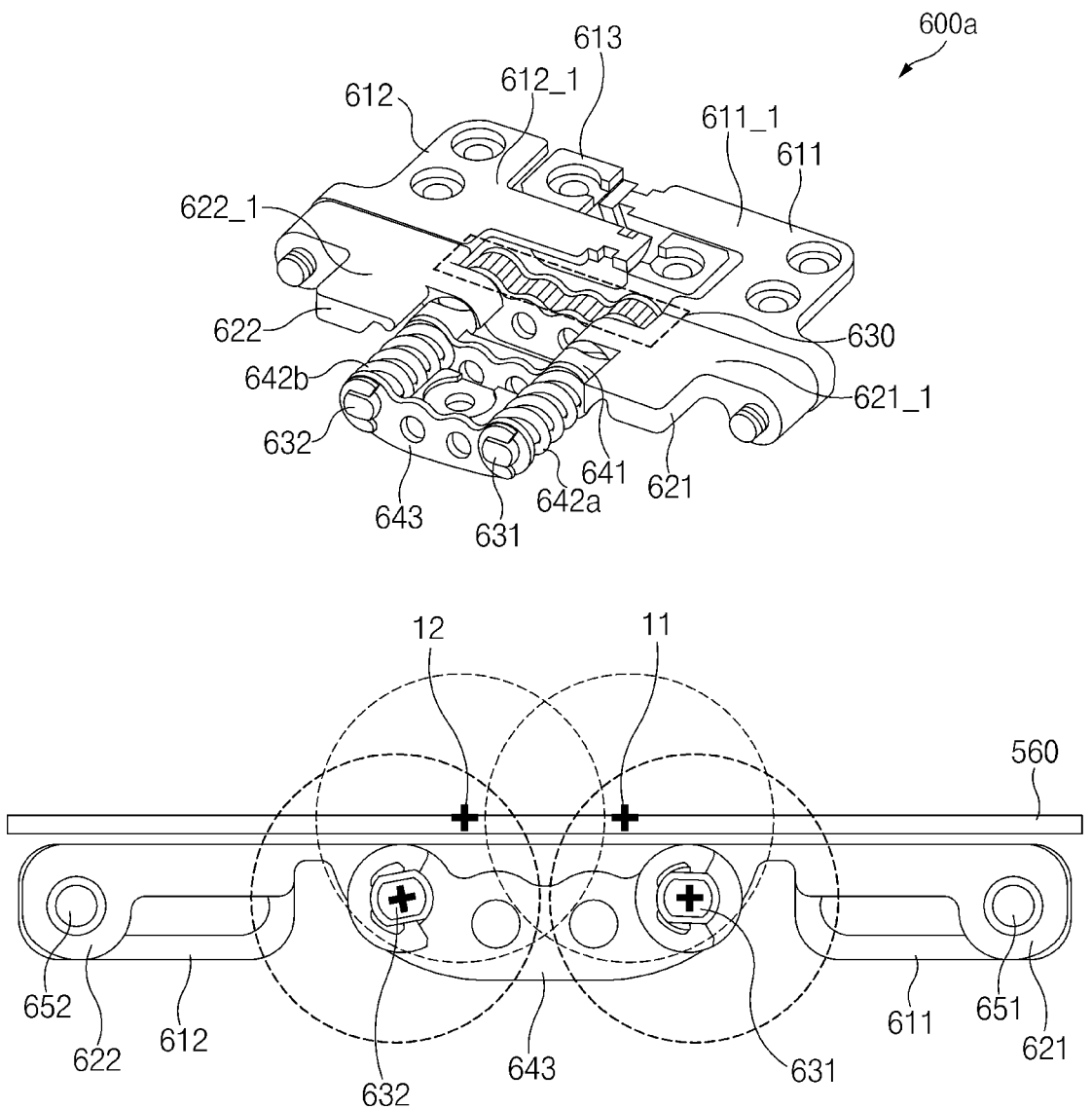
FIG. 8 is a view illustrating a second state of some components of an example electronic device according to various embodiments.

FIG. 8 is a view illustrating a second state of some components of an example electronic device according to various embodiments. Referring to FIG. 8, the some components of the electronic device may include the first hinge structure 600*a* and the display 560, and the first hinge structure 600*a* and the display 560 may be in the second state (e.g., an unfolded state).

Figure 9:
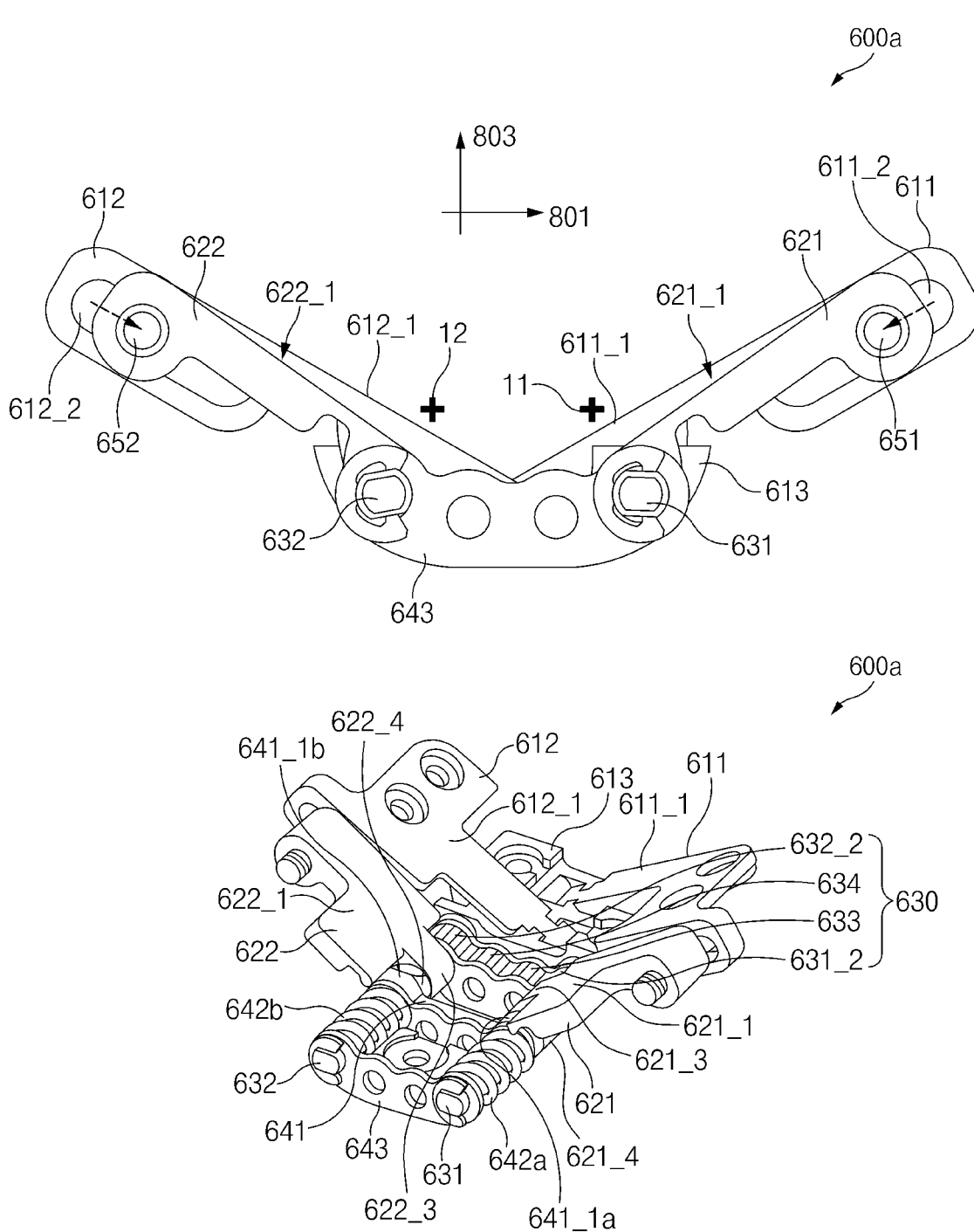
FIG. 9 is a view illustrating a first specified angle state of an example first hinge structure according to various embodiments.

According to an embodiment, the first hinge structure 600*a* may include a first rotary bracket 611, a second rotary bracket 612, a fixed bracket 613, a first arm part 621, a second arm part 622, a cam part 641, a first elastic body 642*a*, a second elastic body 642*b*, a first rotary member 631, a second rotary member 632, a gear structure 630 including shaft gears (e.g., a first shaft gear 631_2 and a second shaft gear 632_2 of FIG. 9) and idle gears (e.g., a first idle gear 633 and a second idle gear 634 of FIG. 9) of the first rotary member 631 and the second rotary member 632, and a support bracket 643. The first rotary bracket 611 may be connected with the first arm part 621 through a first fixing part 651. The second rotary bracket 612 may be connected with the second arm part 622 through a second fixing part 652. The first rotary member 631 may be disposed to penetrate the first arm part 621, the cam part 641, and the first elastic body 642*a* and may be fixed to the support bracket 643. The second rotary member 632 may be disposed to penetrate the second arm part 622, the cam part 641, and the second elastic body 642*b* and may be fixed to the support bracket 643.

According to an embodiment, the display 560 may remain in an unfolded state while the first rotary bracket 611 and the second rotary bracket 612 are maintained in an unfolded state. The first arm part 621 may rotate about the first rotary member 631 within a specified angle range. The second arm part 622 may rotate about the second rotary member 632 within the specified angle range. The first rotary bracket 611 may rotate about a first axis 11 within an angle range that is similar to, or the same as, that of the first arm part 621. The second rotary bracket 612 may rotate about a second axis 12 within an angle range that is similar to, or the same as, that of the second arm part 622. The first axis 11 may be formed in a higher position than the first rotary member 631 (e.g., in a direction toward the display 560). The second axis 12 may be formed in a higher position than the second rotary member 632 (e.g., in the direction toward the display 560). The gap between the first axis 11 and the second axis 12 may be shorter than the gap between the first rotary member 631 and the second rotary member 632. The first axis 11 and the second axis 12 may be formed substantially side by side on a horizontal axis. According to various embodiments, the first axis 11 and the second axis 12 may be formed on the same layer (or level) as the display 560, or may be formed above the display 560.

According to an embodiment, a first bracket body 611_1 of the first rotary bracket 611 and a second bracket body 612_1 of the second rotary bracket 612 may be disposed substantially side by side while the first rotary bracket 611 and the second rotary bracket 612 are maintained in the unfolded state. Based on the illustrated drawing, an upper surface of the first bracket body 611_1 and an upper surface of the second bracket body 612_1 may be identically disposed to face upward. According to an embodiment, the first arm part 621 and the second arm part 622 may also be disposed side by side while the first rotary bracket 611 and the second rotary bracket 612 are maintained in the unfolded state, and thus both a first basic body 621_1 of the first arm part 621 and a second basic body 622_1 of the second arm part 622 may be disposed to face the same direction (e.g., an upper direction based on the illustrated drawing). Accordingly, the first bracket body 611_1, the second bracket body 612_1, the first basic body 621_1, and the second basic body 622_1 may all be disposed side by side with respect to the horizontal axis and may all be disposed to face the same upper direction based on the illustrated drawing. The first bracket body 611_1, the second bracket body 612_1, the first basic body 621_1, and the second basic body 622_1 may support a rear surface of the display 560 without a step.

According to an embodiment, the first elastic body 642*a* and the second elastic body 642*b* may support a cam operation by pushing the cam part 641 toward the first arm part 621 or the second arm part 622 based on an elastic force such that the cam part 641 is engaged with a rotary cam structure of the first arm part 621 or the second arm part 622.

FIG. 9 is a view illustrating a first specified angle state of the first hinge structure according to various embodiments. Referring to FIG. 9, the first hinge structure 600*a* may include the first specified angle state. As described above, the first hinge structure 600*a* may include the first rotary bracket 611, the second rotary bracket 612, the fixed bracket 613, the first arm part 621, the second arm part 622, the gear structure 630, the cam part 641, the first elastic body 642*a*, the second elastic body 642*b*, the first rotary member 631, the second rotary member 632, and the support bracket 643. The first rotary bracket 611 may be connected with the first arm part 621 through the first fixing part 651. The second rotary bracket 612 may be connected with the second arm part 622 through the second fixing part 652.

According to an embodiment, when external pressure acts, the first housing (e.g., the first housing 510 of FIG. 5) to which the first rotary bracket 611 is fixed or the second housing (e.g., the second housing 520 of FIG. 5) to which the second rotary bracket 612 is fixed may rotate through a predetermined angle in a direction toward a vertical axis 803 from one point on a horizontal axis 801 based on the illustrated drawing. For example, the first rotary bracket 611 connected to the first housing 510 may rotate about the first axis 11 by a first angle (e.g., 30 degrees) in a direction toward the vertical axis 803 (e.g., the z-axis of FIG. 5) from one point on the horizontal axis 801 (e.g., the −x-axis or the x-axis of FIG. 5) (e.g., in a direction toward the vertical axis 803 from the right based on the illustrated drawing). When the first rotary bracket 611 is rotated by the first angle by external pressure, the corresponding pressure may be transmitted to the first arm part 621 through the first fixing part 651. Accordingly, the first arm part 621 may rotate about the first rotary member 631 in the direction toward the vertical axis 803 from the horizontal axis 801. In this operation, a force depending on the rotation operation may be transmitted to a first rotary cam 621_4 and a first insertion part 621_3. The first rotary member 631, one side of which is inserted into the first insertion part 621_3, may rotate as the first insertion part 621_3 rotates, and the first shaft gear 631_2 of the first rotary member 631 may rotate depending on the rotation of the first rotary member 631. The first idle gear 633 and the second idle gear 634 engaged with each other may rotate depending on the rotation of the first shaft gear 631_2. Consequently, the second shaft gear 632_2 may rotate, and the second rotary member 632 may rotate correspondingly. A second insertion part 622_3 may rotate depending on the rotation of the second rotary member 632, the second arm part 622 may rotate depending on the rotation of the second insertion part 622_3, and the second rotary bracket 612 connected to the second arm part 622 through the second fixing part 652 may rotate depending on the rotation of the second arm part 622.

According to an embodiment, as described above, the first hinge structure 600a may have the structure in which the first rotary bracket 611 and the second rotary bracket 612 are simultaneously rotated by external pressure (or force). Accordingly, even though external pressure is applied to one of the first housing 510 and the second housing 520 or simultaneously applied to the first housing 510 and the second housing 520, the first rotary bracket 611 and the second rotary bracket 612 may simultaneously rotate. As the first rotary bracket 611 and the second rotary bracket 612 simultaneously rotate, torsion of the first housing 510 and the second housing 520 may be suppressed, and an accurate hinge operation may be performed.

According to various embodiments, a ridge of the first rotary cam 621_4 and a ridge of a second rotary cam 622_4 may remain brought into contact with the vicinity of the top of a ridge of a first fixed cam 641_1a and the vicinity of the top of a ridge of a second fixed cam 641_1b as the first arm part 621 and the second arm part 622 rotate by the first specified angle.

According to an embodiment, the virtual axis 11 of the first rotary bracket 611 and the virtual axis 12 of the second rotary bracket 612 may be disposed between the first rotary member 631 of the first arm part 621 and the second rotary member 632 of the second arm part 622, and therefore the amount of rotation of the first rotary bracket 611 may differ from the amount of rotation of the first arm part 621. Accordingly, the upper surface of the first bracket body 611_1 of the first rotary bracket 611 may further protrude upward beyond an upper surface of the first basic body 621_1 of the first arm part 621 with respect to the horizontal axis 801. As the first rotary bracket and the first arm part 621 are connected through the first fixing part 651, the first fixing part 651 may slide a predetermined distance along a first slide hole 611_2 of the first rotary bracket 611 while the first rotary bracket 611 rotates. Similarly, the upper surface of the second bracket body 612_1 may be rotated to further protrude beyond the second basic body 622_1 with respect to the horizontal axis 801. Furthermore, as the second rotary bracket and the second arm part 622 are connected through the second fixing part 652, the second fixing part 652 may slide a predetermined distance along a second slide hole 612_2 of the second rotary bracket 612 while the second rotary bracket 612 rotates.

Figure 10:
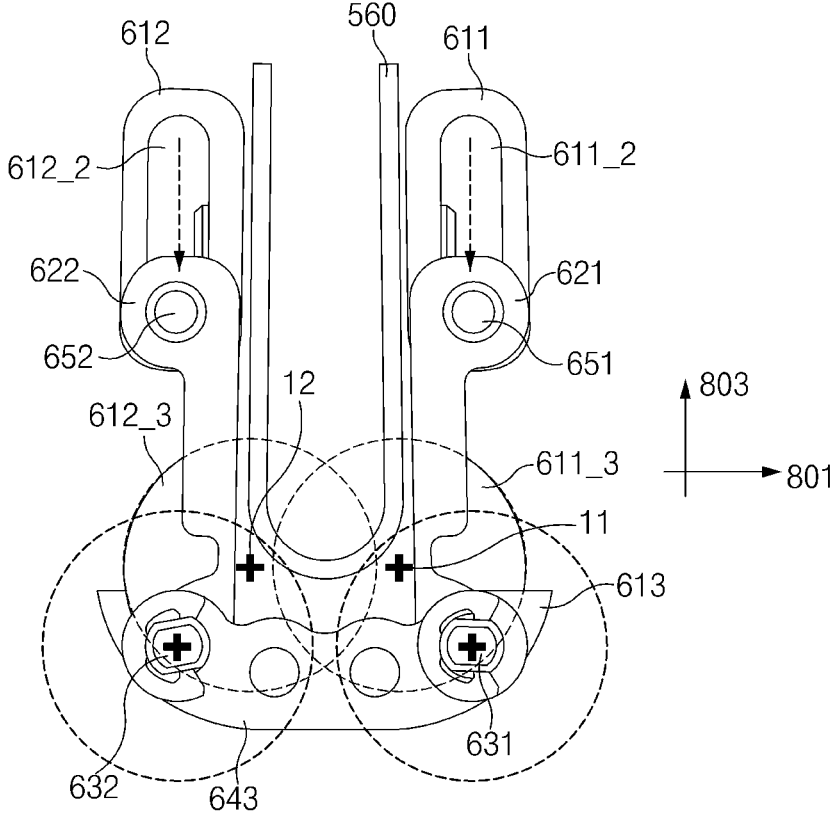
FIG. 10 is a view illustrating a first state of some components of an example electronic device according to various embodiments.
Figure 10:
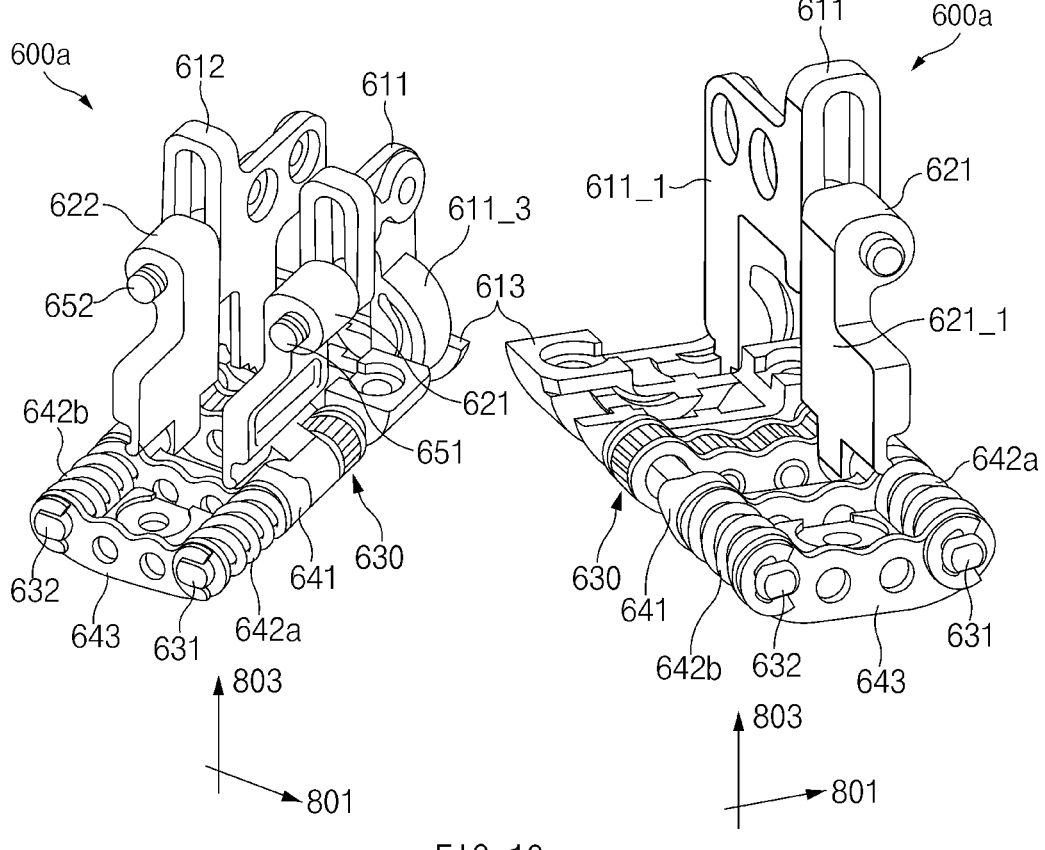

FIG. 10 is a view illustrating a first state of some components of an example electronic device according to various embodiments. Referring to FIG. 10, the electronic device 500 may include the first hinge structure 600a and the display 560. The first state of the first hinge structure 600a may include a folded state. The first hinge structure 600a may include, for example, the fixed bracket 613, the first rotary bracket 611, the second rotary bracket 612, the first arm part 621, the second arm part 622, the first fixing part 651, the second fixing part 652, the first rotary member 631, the second rotary member 632, the gear structure 630 including the shaft gears of the first rotary member 631 and the second rotary member 632, the first elastic body 642a, the second elastic body 642b, and the support bracket 643.

According to an embodiment, the first rotary bracket 611 may include the first bracket body 611_1, the first slide hole 611_2 formed at one end of the first bracket body 611_1, and a first rail 611_3 formed at an opposite end of the first bracket body 611_1. The second rotary bracket 612 may include the second bracket body 612_1, the second slide hole 612_2 formed at one end of the second bracket body 612_1, and a second rail 612_3 formed at an opposite end of the second bracket body 612_1.

In FIG. 10, the first rotary bracket 611 and the second rotary bracket 612 may be disposed to face each other. As the edges of the first housing 510 and the second housing 520 are located adjacent to each other based on the illustrated drawing, the first rotary bracket 611 may rotate about the first axis 11 and may be inclined to the left at a specified angle with respect to the vertical axis 803 in the illustrated drawing. Furthermore, the second rotary bracket 612 may rotate about the second axis 12 and may be inclined to the right at the specified angle with respect to the vertical axis 803. For example, the first axis 11 may be the central axis of rotation of the first rail 611_3, and the second axis 12 may be the central axis of rotation of the second rail 612_3. The first arm part 621 may rotate about the first rotary member 631 and may be located side by side with the first rotary bracket 611, and the second arm part 622 may rotate about the second rotary member 632 and may be located side by side with the second rotary bracket 612. Accordingly, the central portion of the display 560 (e.g., the folding region 563 of FIG. 5) may be bent in a "U" shape, and the remaining region may be maintained in a flat state.

According to an embodiment, as the first rotary bracket 611 and the first arm part 621 are vertically located (or, inclined to the left at the specified angle with respect to the vertical axis 803), the upper surface of the first bracket body 611_1 of the first rotary bracket 611 and the upper surface of the first basic body 621_1 of the first arm part 621 may be disposed side by side without a step. When the electronic device 500 is in the first state (e.g., a folded state), the first fixing part 651 may be located at a lower edge of the first slide hole 611_2 of the first rotary bracket 611 due to a difference in length between the first rotary bracket 611 and the first arm part 621. When the electronic device 500 is in the second state (e.g., an unfolded state), the first fixing part 651 may be located at an upper edge of the first slide hole 611_2 of the first rotary bracket 611. Similarly, when the electronic device 500 is in the first state (e.g., a folded state), the second fixing part 652 may be located at a lower edge of the second slide hole 612_2. When the electronic device 500 is in the second state (e.g., an unfolded state), the second fixing part 652 may be located at an upper edge of the second slide hole 612_2.

According to an embodiment, the first rotary bracket 611 may rotate outward from the central portion of the fixed bracket 613 to the right based on the illustrated drawing while the electronic device 500 is changed from the second state (e.g., an unfolded state) to the first state (e.g., a folded state), and the first rotary bracket 611 may rotate in a direction from the right side of the fixed bracket 213 to the central portion thereof based on the illustrated drawing while the electronic device 500 is changed from the first state to the second state. According to an embodiment, the second rotary bracket 612 may rotate outward from the central portion of the fixed bracket 613 to the left based on the illustrated drawing while the electronic device 500 is changed from the second state to the first state, and the second rotary bracket 612 may rotate in a direction from the left side of the fixed bracket 613 to the central portion thereof based on the illustrated drawing while the electronic device 500 is changed from the first state to the second state. While the electronic device 500 is maintained in a folded state, ridges and valleys of the cam part 641 may be engaged with valleys and ridges of the rotary cams disposed on the first arm part 621 and the second arm part 622. Accordingly, the first elastic body 642a and the second elastic body 642b may return to the initial state (e.g., a released state) from the compressed state of the first specified angle state.

Figure 11:
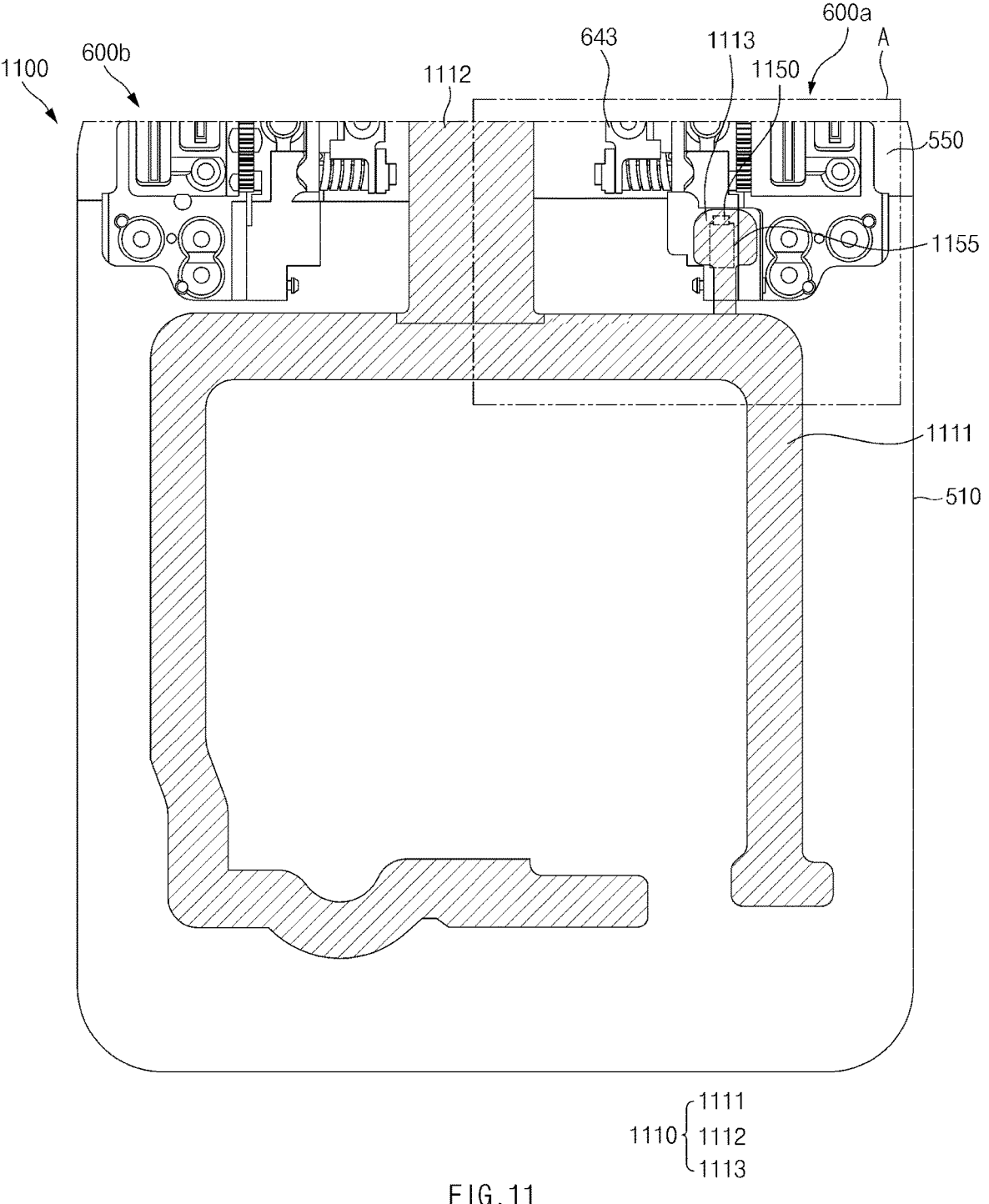
FIG. 11 is a rear view illustrating some components of an example electronic device according to various embodiments.
Figure 12:
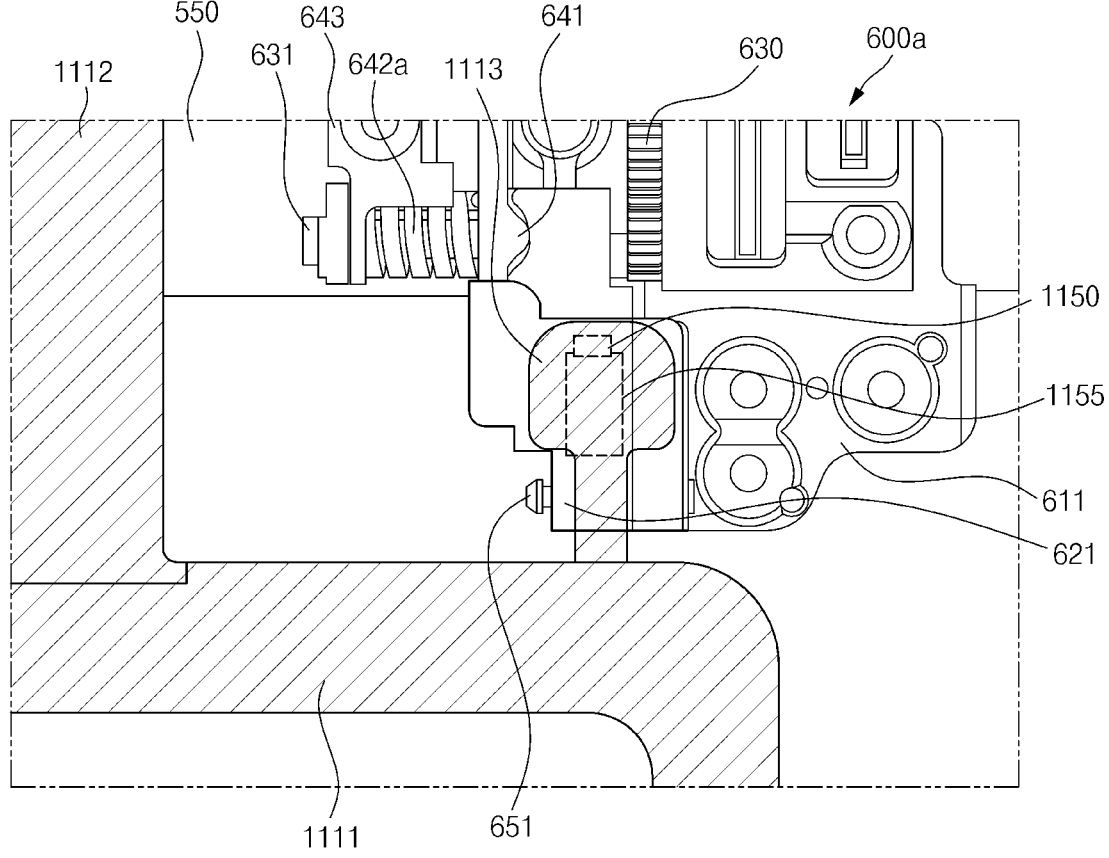
FIG. 12 is an enlarged view illustrating region A of FIG. 11 in an example electronic device according to various embodiments.

Hereinafter, an electronic device 1100 according to various embodiments will be described with reference to FIGS. 11 and 12. FIG. 11 is a rear view illustrating some components of an example electronic device according to various embodiments. FIG. 12 is an enlarged view illustrating region A of FIG. 11 in an example electronic device according to various embodiments.

Referring to FIGS. 11 to 12, the electronic device 1100 according to an embodiment may include a first housing 510, a second housing 520 (refer to FIG. 5), a hinge housing 550, hinge structures 600a and 600b, a flexible printed circuit board 1110, a magnet member 1155, and a sensor 1150. Descriptions of the first hinge structure 600a and the second hinge structure 600b may be found with reference to the descriptions of FIGS. 8, 9, and 10.

According to an embodiment, the first hinge structure 600a may include a first rotary bracket 611, a first arm part 621, a cam part 641, a first elastic body 642a, a first rotary member 631, a second rotary member 632 (refer to FIG. 8), a gear structure 630 including shaft gears and idle gears of the first rotary member 631 and the second rotary member 632, and a support bracket 643. The first rotary bracket 611 may be connected with the first arm part 621 through a first fixing part 651. The first housing 510 may be fixed to the first rotary bracket 611 and may rotate together with the first rotary bracket 611 when the first rotary bracket 611 rotates.

According to an embodiment, the flexible printed circuit board 1110 may include a body part 1111 disposed on the first housing 510 and connected with at least one electronic component (e.g., the first printed circuit board 572 of FIG. 5) on a side of the first housing 510, a connecting part 1112 that crosses a folding region 563 (or, a folding axis) of a display 560 and electrically connects at least one component on a side of the first housing 510 and at least one component on a side of the second housing 520, and an extension 1113 extending from the body part 1111 toward the hinge housing 550.

According to an embodiment, in a second state (e.g., an unfolded state) of the electronic device 1100, at least a portion of the extension 1113 of the flexible printed circuit board 1110 may overlap the first hinge structure 600a. At least a portion of the flexible printed circuit board 1110 may be attached to the first housing 510. The flexible printed circuit board 1110 may be fixed or moved together with the first housing 110 in response to fixation or movement of the first housing 510. When the first rotary bracket 611 rotates, the flexible printed circuit board 1110 (or, the extension 1113 of the flexible printed circuit board 1110) may move together with the first housing 510, which is fixed to the first rotary bracket 611, in response to the rotation of the first rotary bracket 611.

According to an embodiment, the magnet member 1155 may be disposed on one region of the first hinge structure 600a on the side of the first housing 510. The position of the magnet member 1155 relative to the sensor 1150 may be changed depending on states of the electronic device 1100. The magnet member 1155 may be disposed to move in response to a rotation operation of the first arm part 621. For example, the magnet member 1155 may be attached to the first arm part 621. The magnet member 1155 may move in response to the rotation operation of the first arm part 621.

According to an embodiment, the sensor 1150 may be located on one region in the first housing 510 connected to the first rotary bracket 611. The sensor 1150 may be directly mounted on the first housing 510, or may be disposed on one component of the electronic device 1100 connected (or, fixed) to the first housing 510. In an embodiment, the sensor 1150 may be located on one region (e.g., the extension 1113) of the flexible printed circuit board 1110 within the first housing 510. For example, the sensor 1150 may be mounted on a surface of the extension 1113 of the flexible printed circuit board 1110 that is close to the magnet member 1155. In another example, the sensor 1150 may be mounted on the opposite side to the surface of the extension 1113 of the flexible printed circuit board 1110 that is close to the magnet member 1155. According to various embodiments, the sensor 1150 may be located on one component (e.g., the first printed circuit board 572 of FIG. 5) located in the first housing 510. The sensor 1150 may be fixed at one position or moved in response to fixation or movement of the first housing 510. For example, when the electronic device 1100 is folded or unfolded with the first housing 510 fixed at one position, the position of the sensor 1150 indirectly or directly connected to the first housing 510 may be maintained without moving. In this case, as the electronic device 1100 is folded or unfolded, the magnet member 1155 may move in response to rotation of the first arm part 621, and the position of the magnet member 1155 relative to the sensor 1150 may be changed.

According to an embodiment, the magnet member 1155 and the sensor 1150 may be located together with one of the first housing 510 or the second housing 520. Without being limited to that illustrated in FIGS. 11 and 12, the sensor 1150 and the magnet member 1155 may be located on the side of the second housing 520. For example, the sensor 1150 may be directly or indirectly connected to the second housing 520 or a second rotary bracket 612 (refer to FIG. 8). The magnet member 1155 may be disposed on one region (e.g., a second arm part 622 (refer to FIG. 8)) of the first hinge structure 600a on the side of the second housing 520, and the position of the magnet member 1155 relative to the sensor 1150 may be changed depending on states of the electronic device 1100. Unlike that illustrated in the drawings, the magnet member 1155 may be directly or indirectly connected to the first housing 510, and the sensor 1150 may be located on one region (e.g., the first arm part 621) of the first hinge structure 600a.

According to an embodiment, when the magnet member 1155 is located on the first housing 510 and the sensor 1150 is located on the second housing 520, the distance between the sensor 1150 and the magnet member 1155 may be long, and therefore the amount of displacement of a magnetic field detected by the sensor 1150 for calculation of a folding angle may not be sufficiently large. In the electronic device 1100 according to an embodiment, the magnet member 1155 and the sensor 1150 may be located together on one of the first housing 510 and the second housing 520, and thus the sensor 1150 may be disposed close to the magnet member 1155.

Figure 13:
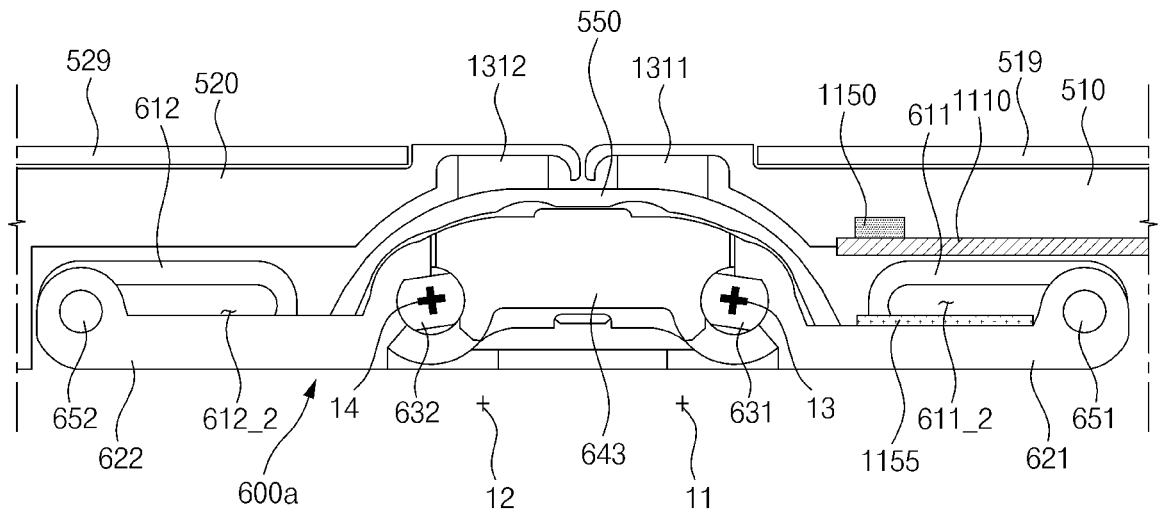
FIG. 13 is a sectional view of an example electronic device in a second state according to various embodiments.
Figure 14:
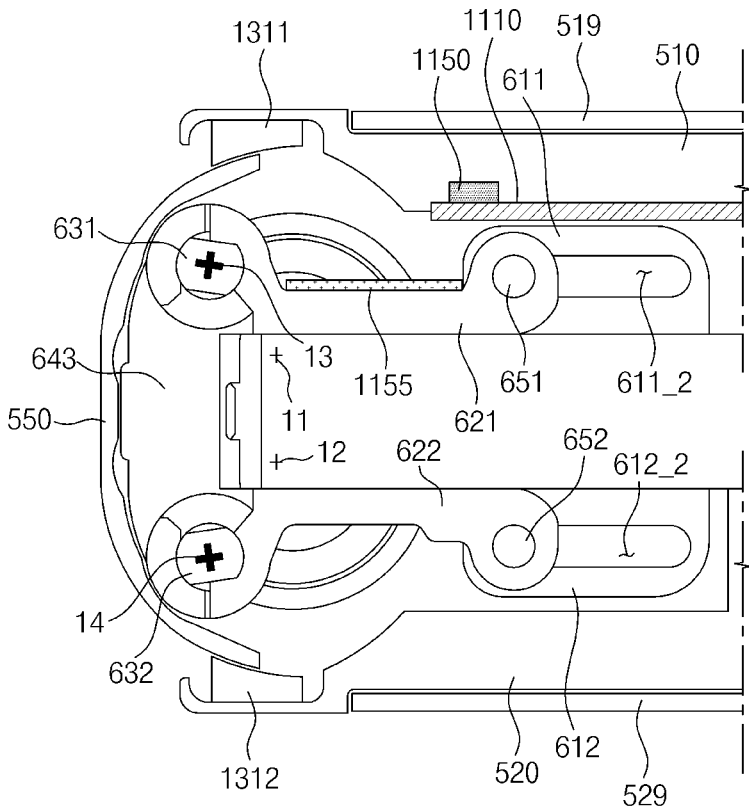
FIG. 14 is a sectional view of an example electronic device in a first state according to various embodiments.

Hereinafter, a first state and a second state of an example electronic device according to various embodiments will be described with reference to FIGS. 13 and 14. FIG. 13 is a sectional view of an example electronic device in the second state (e.g., a flat state, an unfolded state, or an open state) according to various embodiments. FIG. 14 is a sectional view of an example electronic device in the first state (e.g., a folded state or a closed state) according to various embodiments.

The electronic device according to an embodiment (e.g., the electronic device 1100 of FIG. 11) may include the first housing 510, the second housing 520, the hinge housing 550, a first cover 519, a second cover 529, the first hinge structure 600a, sweepers 1311 and 1312, the flexible printed circuit board 1110, the magnet member 1155, and the sensor 1150. Description of the first hinge structure 600a may be found with reference to the descriptions of FIGS. 8, 9, and 10.

According to an embodiment, the first hinge structure 600a may include the first rotary bracket 611, the second rotary bracket 612, the first arm part 621, the second arm part 622, the first rotary member 631, the second rotary member 632, and the support bracket 643. The first rotary bracket 611 may be connected with the first arm part 621 through the first fixing part 651. The second rotary bracket 612 may be connected with the second arm part 622 through a second fixing part 652. The first housing 510 may be fixed to the first rotary bracket 611 and may rotate together with the first rotary bracket 611 when the first rotary bracket 611 rotates. The second housing 520 may be fixed to the second rotary bracket 612 and may rotate together with the second rotary bracket 612 when the second rotary bracket 612 rotates.

According to an embodiment, the first rotary bracket 611 may rotate about a first axis 11. The second rotary bracket 612 may rotate about a second axis 12 within an angle range that is similar to, or the same as, that of the second arm part 622. The first arm part 621 may rotate about a third axis 13 corresponding to the first rotary member 631 within a specified angle range. The second arm part 622 may rotate about a fourth axis 14 corresponding to the second rotary member 632 within the specified angle range. The third axis 13 may differ from the first axis 11, and the fourth axis 14 may differ from the second axis 12. While the first rotary bracket 611 rotates, the first fixing part 651 may slide along a first slide hole 611_2 of the first rotary bracket 611 by a predetermined distance. While the second rotary bracket 612 rotates, the second fixing part 652 may slide along a second slide hole 612_2 of the second rotary bracket 612 by a predetermined distance. As the first rotary bracket 611 and the first arm part 621 rotate about different axes, the position of the first arm part 621 relative to the first rotary bracket 611 may be changed depending on a folding angle. Likewise, as the second rotary bracket 612 and the second arm part 622 rotate about different axes, the position of the second arm part 622 relative to the second rotary bracket 612 may be changed depending on a folding angle.

According to an embodiment, the sweepers 1311 and 1312 may include the first sweeper 1311 disposed in the first housing 510 and the second sweeper 1312 disposed in the second housing 520. The first sweeper 1311 may be located at one edge of the first housing 510 and may fill a space between the first housing 510 and the hinge housing 550.

The second sweeper 1312 may be located at one edge of the second housing 520 and may fill a space between the second housing 520 and the hinge housing 550. The sweepers 1311 and 1312 may prevent (or reduce an amount of) foreign matter from permeating into the electronic device through the space between the first housing 510 and the hinge housing 550 or the space between the second housing 520 and the hinge housing 550.

According to an embodiment, the magnet member 1155 may be at least partially located on one surface of the first arm part 621 and may rotate about the third axis 13 together with the first arm part 621. The magnet member 1155 may include, on one surface facing the sensor 1150, at least two polarities arranged in one direction. The sensor 1150 may be located on the flexible printed circuit board 1110. The flexible printed circuit board 1110 may be attached to the first housing 510, and the first housing 510 may be fixed to the first rotary bracket 611. The sensor 1150 may rotate about the first axis 11 together with the first housing 510, the flexible printed circuit board 1110, and the first rotary bracket 611. When the electronic device is folded or unfolded, the magnet member 1155 may move in one direction relative to the sensor 1150. The direction of movement of the magnet member 1155 relative to the sensor 1150 may, for example, be the same as the direction in which the at least two polarities are arranged on the one surface of the magnet member 1155. The position of the sensor 1150 relative to the magnet member 1155 may be changed depending on a change of state of the electronic device, and the sensor 1150 may detect at least two directional components of magnetic flux density that vary depending on the change of the position of the sensor 1150.

Figure 15:
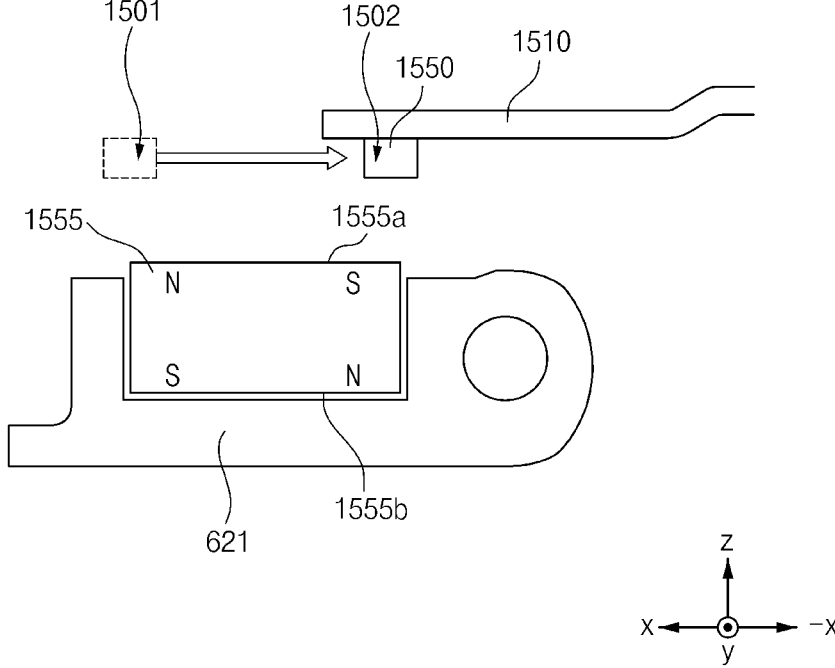
FIG. 15 is a sectional view illustrating some components included in an example electronic device according to various embodiments.

Hereinafter, a magnet member 1555 and a sensor 1550 included in an example electronic device according to various embodiments will be described with reference to FIG. 15. FIG. 15 is a sectional view illustrating some components included in an example electronic device according to various embodiments. The electronic device according to an embodiment (e.g., the electronic device 1100 of FIG. 11) may include a first arm part 621 of a hinge structure, the magnet member 1555, a flexible printed circuit board 1510, and the sensor 1550. The first arm part 621 of the hinge structure may correspond to the first arm part 621 of FIGS. 12, 13, and 14, and the flexible printed circuit board 1510 may correspond to the flexible printed circuit board 1110 of FIGS. 12, 13, and 14.

According to an embodiment, the magnet member 1555 may be located on one region of the first arm part 621. The magnet member 1555 may include, on a first surface 1555a facing the sensor 1550, at least two polarities arranged in the first direction x. According to an embodiment, a first pole S and a second pole N may be arranged in the first direction x on the first surface 1555a of the magnet member 1555. On the first surface 1555a of the magnet member 1555, one region located in the first direction x may represent the second pole N, and one region located in the direction opposite to the first direction x may represent the first pole S. Unlike that illustrated in FIG. 15, a plurality of first poles S and a plurality of second poles N may be alternately located in the first direction x on the first surface 1555a of the magnet member 1555. Poles opposite to the poles on the first surface 1555a may be arranged on a second surface 1555b of the magnet member 1555 that is located on the opposite side to the first surface 1555a. For example, on the second surface 1555b of the magnet member 1555, a region overlapping the first pole S of the first surface 1555a in the second direction z may include a second pole N, and a region overlapping the second pole N of the first surface 1555a in the second direction z may include a first pole S.

According to an embodiment, the sensor 1550 may be located on one region of the flexible printed circuit board 1510. Based on a change of state of the electronic device, the sensor 1550 may move from a first position 1501 adjacent to one end of the magnet member 1555 to a second position 1502 adjacent to an opposite end of the magnet member 1555, or may move from the second position 1502 to the first position 1501. For example, the sensor 1550 may be located at the first position 1501 in a second state (e.g., an unfolded state) of the electronic device and may be located at the second position 1502 in a first state (e.g., a folded state) of the electronic device. Based on a change of state of the electronic device from the first state to the second state, the sensor 1550 may move in the first direction x from the second position 1502 and may reach the first position 1501. Based on a change of state of the electronic device from the second state to the first state, the sensor 1550 may move from the first position 1501 in the direction −x opposite to the first direction x and may reach the second position 1502. The sensor 1550 whose position relative to the magnet member 1555 is changed depending on the states may detect at least two directional components of magnetic flux density, and the electronic device may detect a state of the electronic device, based on the detected at least two directional components of the magnetic flux density.

FIG. 15 illustrates one example representing a change in the position of the sensor 1550 relative to the magnet member 1555, and the absolute position of the magnet member 1555 may not be fixed. For example, the magnet member 1555 may move relative to the sensor 1550 in the first direction x or in the direction −x opposite to the first direction x, or both the magnet member 1555 and the sensor 1550 may move.

Figure 16:
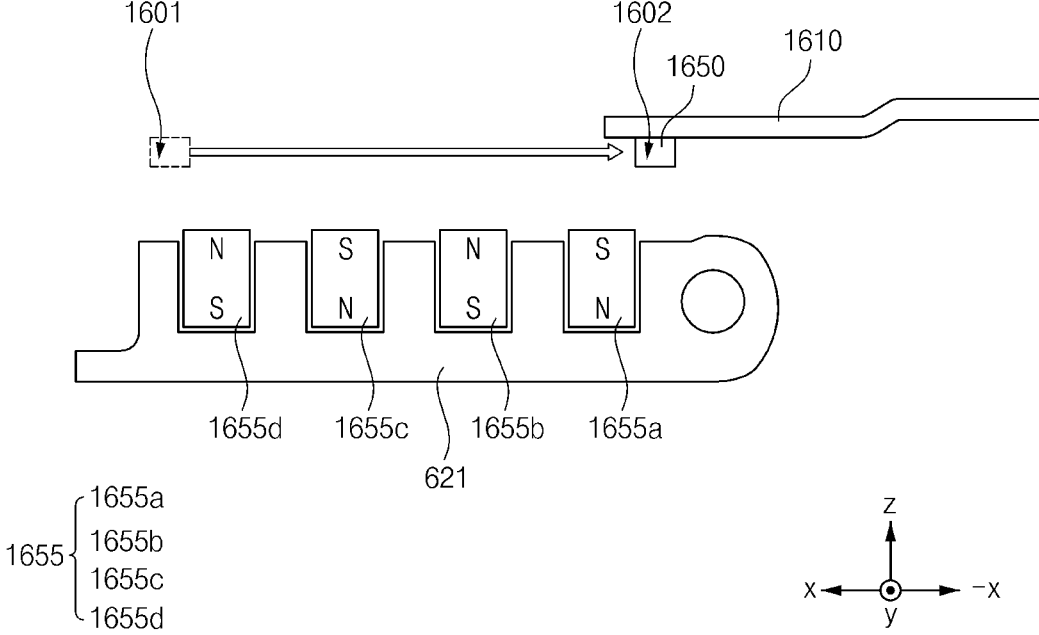
FIG. 16 is a sectional view illustrating some components included in an example electronic device according to various embodiments.

Hereinafter, a plurality of magnet members 1655 and a sensor 1650 included in an example electronic device according to various embodiments will be described with reference to FIG. 16. FIG. 16 is a sectional view illustrating some components included in an example electronic device according to various embodiments. The electronic device according to an embodiment (e.g., the electronic device 1100 of FIG. 11) may include a first arm part 621 of a hinge structure, a plurality of magnet members 1655, a flexible printed circuit board 1610, and a sensor 1650. The first arm part 621 of the hinge structure may correspond to the first arm part 621 of FIGS. 12, 13, and 14, and the flexible printed circuit board 1610 may correspond to the flexible printed circuit board 1110 of FIGS. 12, 13, and 14.

According to an embodiment, the plurality of magnet members 1655 may be located on one region of the first arm part 621. Each of the plurality of magnet members 1655 may be mounted on the first arm part 621 such that a surface representing a first pole S or a second pole N faces in the second direction z. The plurality of magnet members 1655 may be arranged such that different poles are adjacent to each other in the first direction x. The plurality of magnet members 1655 may be mounted such that the first poles S and the second poles N are alternately located in the first direction x. For example, the plurality of magnet members 1655 may include a first magnet member 1655a, a second magnet member 1655b, a third magnet member 1655c, and a fourth magnet member 1655d arranged in the first direction x. The first pole S of the first magnet member 1655a, the second pole N of the second magnet member 1655b, the first pole S of the third magnet member 1655c, and the second pole N of the fourth magnet member 1655d may be disposed to face in the second direction z. The second pole N of the first magnet member 1655a, the first pole S of the second magnet member 1655b, the second pole N of the third magnet member 1655c, and the first pole S of the fourth magnet member 1655d may be disposed to face in the direction opposite to the second direction z.

According to an embodiment, the sensor 1650 may be located on one region of the flexible printed circuit board 1610. Based on a change of state of the electronic device, the sensor 1650 may move from a first position 1601 adjacent to the fourth magnet member 1655d to a second position 1602 adjacent to the first magnet member 1655a, or may move from the second position 1602 to the first position 1601. For example, the sensor 1650 may be located at the first position 1601 in a second state (e.g., an unfolded state) of the electronic device and may be located at the second position 1602 in a first state (e.g., a folded state) of the electronic device. Based on a change of state of the electronic device from the first state to the second state, the sensor 1650 may move in the first direction x from the second position 1602 and may reach the first position 1601. Based on a change of state of the electronic device from the second state to the first state, the sensor 1650 may move from the first position 1601 in the direction −x opposite to the first direction x and may reach the second position 1602. The sensor 1650 whose position relative to the magnet members 1655 is changed depending on the states may detect at least two directional components of magnetic flux density, and the electronic device may detect a state of the electronic device, based on the detected at least two directional components of the magnetic flux density.

FIG. 16 illustrates one example representing a change in the position of the sensor 1650 relative to the magnet members 1655, and the absolute position of the magnet members 1655 may not be fixed. For example, the magnet members 1655 may move relative to the sensor 1650 in the first direction x or in the direction −x opposite to the first direction x, or both the magnet members 1655 and the sensor 1655 may move.

Figure 17:
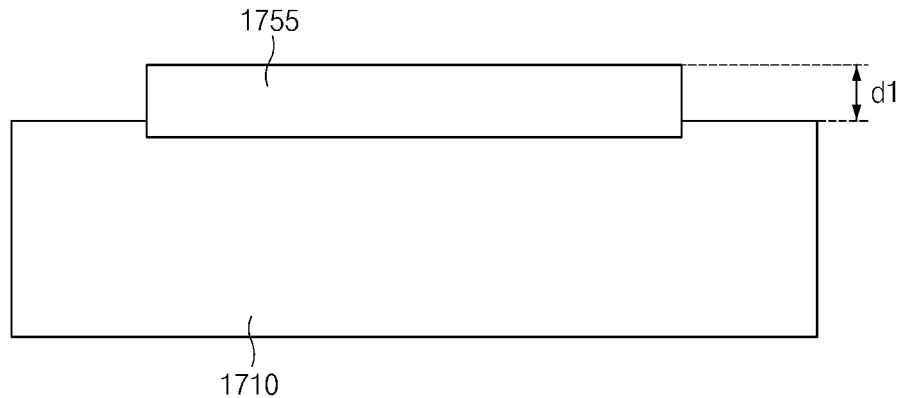
FIG. 17 is a view illustrating some components of an example electronic device according to various embodiments.
Figure 17:
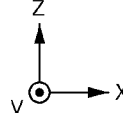

FIG. 17 is a view illustrating some components of an example electronic device according to various embodiments. Referring to FIG. 17, the electronic device according to an embodiment may include a magnet member 1755 and a fixed member 1710 (e.g., the first arm part 621 of FIG. 12).

According to an embodiment, the magnet member 1755 may be mounted on the fixed member 1710. The magnet member 1755 may protrude from the fixed member 1710 by a specified distance d1. The fixed member 1710 may include a magnetic body and may be magnetized in a magnetic field formed by the magnet member 1755. When the magnet member 1755 is located inside the fixed member 1710 that is a magnetic body, a difference between a maximum value and a minimum value of a second directional component of magnetic flux density detected by a sensor (e.g., the sensor 240 of FIG. 2) may be reduced due to an influence of the magnetized fixed member 1710. As the magnet member 1755 further protrudes, the influence of the magnetized fixed member 1710 may be reduced, and the difference between the maximum value and the minimum value of the second directional component of the magnetic flux density detected by the sensor (e.g., an operating range) may be increased. In a case in which the difference between the maximum value and the minimum value of the second directional component of the magnetic flux density detected by the sensor is increased, the displacement of the second directional may be increased when the electronic device experiences a change of state, and a state of the electronic device may be accurately detected.

Figure 18:
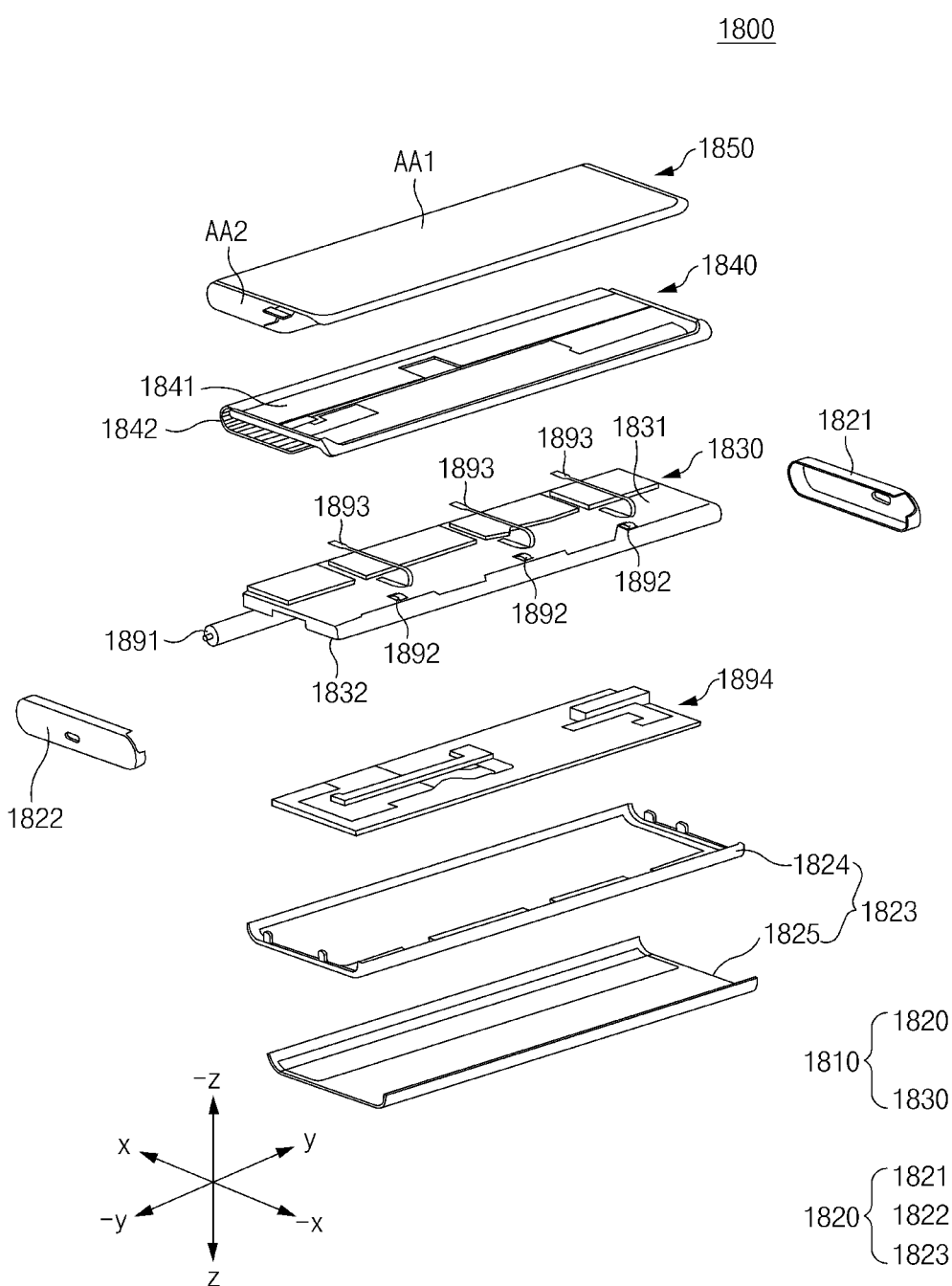
FIG. 18 is an exploded perspective view of an example electronic device according to various embodiments.
Figure 19:
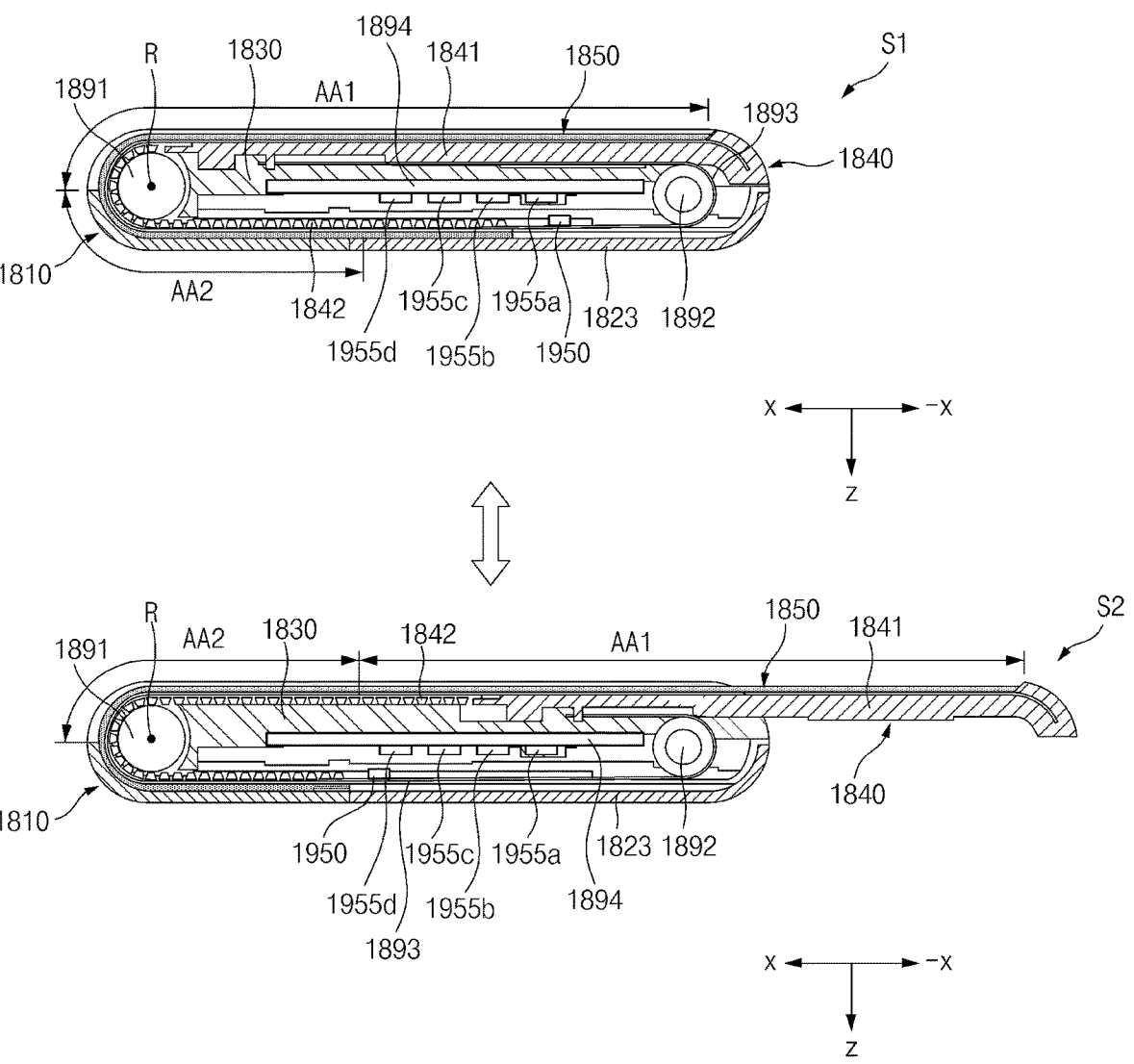
FIG. 19 illustrates sectional views of an example electronic device in a first state and a second state according to various embodiments.

FIG. 18 is an exploded perspective view of an example electronic device according to various embodiments. FIG. 19 illustrates sectional views of an example electronic device in a first state S1 (e.g., a retracted state) and a second state S2 (e.g., an extended state) according to various embodiments.

Referring to FIGS. 18 and 19, the electronic device 1800 according to an embodiment may include the first housing 1810, the second housing 1840, a display 1850, a first roller 1891, a second roller 1892, a tension belt 1893, a circuit board 1894, a plurality of magnet members 1955a, 1955b, 1955c, and 1955d, and a sensor 1950.

According to an embodiment, the first housing 1810 may include a case 1820 and a bracket 1830. The bracket 1830 may be coupled to the case 1820 and may be at least partially surrounded by the case 1820. For example, the bracket 1830 may be fixed to the case 1820, and the positions of the case 1820 and the bracket 1830 relative to the second housing 1840 may be changed depending on a sliding operation of the second housing 1840. The case 1820 and the bracket 1830 may be used as the basis for sliding movement of the second housing 1840 and the display 1850.

According to an embodiment, the case 1820 may form at least a portion of an outer surface of the electronic device 1800. The case 1820 may include a first side member 1821, a second side member 1822, and a rear member 1823. The first side member 1821 and the second side member 1822 may be disposed to face each other in the direction y substantially perpendicular to a sliding direction of the second housing 1840 (e.g., the first direction x or the direction –x opposite to the first direction). The rear member 1823 may be disposed between the first side member 1821 and the second side member 1822 and may be connected to the first side member 1821 and the second side member 1822. The first side member 1821, the second side member 1822, and the rear member 1823 may be coupled together to form a space in which at least portions of the other components (e.g., the bracket 1830, the second housing 1840, and the circuit board 1894) of the electronic device 1800 are disposed.

According to an embodiment, the rear member 1823 may include a frame 1824 and a cover 1825. For example, the frame 1824 may be coupled with the bracket 1830. The cover 1825 may be coupled to the frame 1824 to form at least a portion of a rear surface of the electronic device 1800. A space in which the second housing 1840 and an extended region AA2 of the display 1850 are accommodated may be formed between the cover 1825 and the bracket 1830.

According to an embodiment, the first side member 1821, the second side member 1822, the frame 1824, and/or the back cover 1825 may be formed as separate components and may be assembled or coupled together. However, the disclosure is not limited thereto, and according to various embodiments of the disclosure, the first side member 1821, the second side member 1822, the frame 1824, and the back cover 1825 may, for example, be integrally formed and may be implemented as one part.

According to an embodiment, the bracket 1830 may be disposed to at least partially overlap the second housing 1840. A first surface 1831 of the bracket 1830 (e.g., a surface facing in the –z-axis direction based on FIG. 18 or an upper surface) may face a plate part 1841 of the second housing 1840, and a second surface 1832 of the bracket 1830 (e.g., a surface facing in the z-axis direction based on FIG. 18 or a lower surface) may face the circuit board 1894. The circuit board 1894 may be disposed on the second surface 1832 of the bracket 1830.

According to an embodiment, the second housing 1840 may be fastened the first housing 1810 so as to slide relative to the first housing 1810. The second housing 1840 may be disposed to surround at least a portion of the bracket 1830. The second housing 1840 may include the plate part 1841 supporting one portion of a basic region AA1 of the display 1850 and a multi-joint member 1842 supporting another portion of the basic region AA1 and one portion of the extended region AA2 of the flexible display 1850. For example, the multi joint member 1842 may extend from the plate part 1841 and may be a bendable part. The multi joint member 1842 may at least partially form a curved surface in response to a sliding operation of the second housing 1840.

According to an embodiment, the multi joint member 1842 may be coupled to the first roller 1891. The multi joint member 1842 may include a plurality of bars extending in a direction substantially parallel to a rolling axis R of the first roller 1891. For example, the multi-joint member 1842 may include a flexible track or a hinge rail. According to an embodiment, the plate part 1841 may slide in the first direction x or the direction –x opposite to the first direction. The multi joint member 1842 may be configured such that one portion is rotated by the first roller 1891 and another portion slides in the first direction x or the direction –x opposite to the first direction.

According to an embodiment, the first roller 1891 may be disposed on one side surface of the bracket 1830. The first roller 1891 may be coupled so as to be rotatable relative to the bracket 1830. For example, the first roller 1891 may be rotatable about the rolling axis R in opposite directions depending on a sliding operation of the second housing 1840. The first roller 1891 may be brought into contact with a portion of the multi joint member 1842 of the second housing 1840. For example, the second housing 1840 may be disposed such that the multi joint member 1842 surrounds at least a portion of the first roller 1891. The first roller 1891 may rotate a portion of the multi joint member 1842. The first roller 1891 may be brought into contact with different regions of the multi-joint member 1842 depending on a change of state of the electronic device 1800.

According to an embodiment, the second housing 1840 may be coupled to the bracket 1830 by the tension belt 1893 and the second roller 1892 so as to slide. The tension belt 1893 may connect an end portion of the plate part 1841 and an end portion of the multi joint member 1842 of the second housing 140. The second roller 1892 may rotate in the same direction as the first roller 191 depending on a sliding operation of the second housing 1840. For example, between the plate part 1841 and the multi joint member 1842, the tension belt 1893 may provide tension to the multi-joint member 1842. According to an embodiment, when the plate part 1841 moves in the direction –x opposite to the first direction, one end portion of the tension belt 1893 connected with the plate part 1841 may move in the direction –x opposite to the first direction, and an opposite end portion of the tension belt 1893 connected with the multi joint member 1842 may move in the first direction x. In contrast, when the plate part 1841 moves in the first direction x, the one end portion of the tension belt 1893 may move in the first direction x, and the opposite end portion of the tension belt 1893 may move in the direction –x opposite to the first direction. However, the illustrated embodiment is illustrative, and according to various embodiments, the electronic device 1800 may not include at least one of the second roller 1892 or the tension belt 1893.

According to an embodiment, the display 1850 may be disposed on the second housing 1840. For example, the display 1850 may be coupled to the second housing 1840 so as to slide relative to the first housing 1810 together with the second housing 1840. The display 1850 may include the basic region AA1 and the extended region AA2 extending from the basic region AA1. For example, the basic region AA1 may refer to a region visually exposed on a front surface of the electronic device 100 in the first state. The extended region AA2 may refer to a region that is located inside the electronic device 1800 in the first state and that moves out of the electronic device 1800 and is at least partially visually exposed on the front surface of the electronic device 1800 as the electronic device 1800 is changed to the second state.

The electronic device 1800 according to an embodiment may be configured such that the basic region AA1 is exposed on the front surface of the electronic device 1800 in the first state S1 and at least a portion of the extended region AA2 is exposed on the front surface of the electronic device 1800 together with the basic region AA1 in the second state S2. The position of the extended region AA2 may be changed as at least a portion thereof rotates together by rotation of the first roller 1891. For example, the extended region AA2 may be located on the front surface of the electronic device 1800 together with the basic region AA1 as the second housing 1840 moves relative to the first housing 1810 in the direction −x opposite to the first direction. Furthermore, the extended region AA2 may be accommodated in the space between the bracket 1830 and the rear member 1823 as the second housing 1840 moves relative to the first housing 1810 in the first direction x.

According to an embodiment, the circuit board 1894 may be disposed in the first housing 1810. The circuit board 1894 may be disposed between the bracket 1830 and the rear member 1823. For example, the circuit board 1894 may be supported by the bracket 1830 and may be disposed inside the electronic device 1800. The circuit board 1894 may be coupled to at least a partial region of the second surface 1832 of the bracket 1830 and may be fixed to the first housing 1810. The circuit board 1894, together with the first housing 1810, may move relative to the second housing 1840 when the second housing 1840 slides.

According to an embodiment, the circuit board 1894 may include a printed circuit board (PCB), a flexible PCB (FPCB), or a rigid-flexible PCB (RFPCB). Various electronic parts included in the electronic device 1800 may be electrically connected to the circuit board 1894. A processor (e.g., the processor 120 of FIG. 1), a memory (e.g., the memory 130 of FIG. 1), and/or an interface (e.g., the interface 177 of FIG. 1) may be disposed on the circuit board 1894. For example, the processor may include a main processor and/or an auxiliary processor, and the main processor and/or the auxiliary processor may include at least one of a central processing unit, an application processor, a graphic processing unit, an image signal processor, a sensor hub processor, or a communication processor. For example, the memory may include a volatile memory or a non-volatile memory. For example, the interface may include a high definition multimedia interface (HDMI), a universal serial bus (USB) interface, an SD card interface, and/or an audio interface. Furthermore, the interface may electrically or physically connect the electronic device 1800 with an external electronic device and may include a USB connector, an SD card/MMC connector, or an audio connector.

In an embodiment, a battery (e.g., the battery 189 of FIG. 1) may supply power to at least one component of the electronic device 1800. The battery may be integrally disposed inside the electronic device 1800, or may be disposed so as to be detachable from the electronic device 1800. According to various embodiments of the disclosure, the battery may be supported by the bracket 1830 together with the circuit board 1894 and may be disposed inside the electronic device 1800. The battery may be coupled to at least a partial region of the second surface 1832 of the bracket 1830. The battery may be disposed on substantially the same plane as the circuit board 1894. The battery, together with the first housing 1810, may move relative to the second housing 1840 when the second housing 1840 slides.

According to an embodiment, the plurality of magnet members 1955a, 1955b, 1955c, and 1955d may be mounted on one region in the first housing 1810. The plurality of magnet members 1955a, 1955b, 1955c, and 1955d may be located on one region of the circuit board 1894 disposed in the first housing 1810. Each of the plurality of magnet members 1955a, 1955b, 1955c, and 1955d may be located on the circuit board 1894 such that a surface representing a first pole (e.g., an S pole) or a second pole (e.g., an N pole) faces toward the sensor 1950.

According to an embodiment, the plurality of magnet members 1955a, 1955b, 1955c, and 1955d may be arranged in the first direction x such that different polarities are adjacent to each other. The plurality of magnet members 1955a, 1955b, 1955c, and 1955d may be mounted such that the first poles and the second poles are alternately located in the first direction x. For example, the plurality of magnet members 1955a, 1955b, 1955c, and 1955d may include the first magnet member 1955a, the second magnet member 1955b, the third magnet member 1955c, and the fourth magnet member 1955d arranged in the first direction x. The first pole of the first magnet member 1955a, the second pole of the second magnet member 1955b, the first pole of the third magnet member 1955c, and the second pole of the fourth magnet member 1955d may be disposed to face toward the sensor 1950.

According to an embodiment, the sensor 1950 may be located to face at least one of the plurality of magnet members 1955a, 1955b, 1955c, and 1955d in one region of the second housing 1840. According to an embodiment, the sensor 1950 may be located on a side of the multi joint member 1842 of the second housing 1840. As the second housing 1840 moves relative to the first housing 1810 in the first direction x or in the direction −x opposite to the first direction, the sensor 1950 may move in the direction −x opposite to the first direction or in the first direction x. The sensor 1950 may be disposed adjacent to the first magnet member 1955a in the first state S1 of the electronic device 1800 and may be disposed adjacent to the fourth magnet member 1955d in the second state S2. As the electronic device 1800 is changed from the first state S1 to the second state S2, the sensor 1950 may move in the first direction x. The electronic device 1800 may detect the degree of extension of the electronic device 1800 (or, the area by which the electronic device 1800 is extended) using at least two directional components of magnetic flux density detected through the sensor 1950.

In an embodiment, the mounting positions of the magnet members 1955a, 1955b, 1955c, and 1955d and the sensor 1950 are not limited to those illustrated in FIGS. 18 and 19. The magnet members 1955a, 1955b, 1955c, and 1955d may be located on the multi joint member 1842 of the second housing 1840, and the sensor 1950 may be located on one region of the circuit board 1894 disposed in the first housing 1810. In this case, the magnet members 1955a, 1955b, 1955c, and 1955d may move in the first direction x as the electronic device 1800 is changed from the first state S1 to the second state S2. The electronic device 1800 may detect the degree of extension of the electronic device 1800 (or, the area by which the electronic device 1800 is extended) using the at least two directional components of the magnetic flux density detected through the sensor 1950.

The electronic device 1800 illustrated in FIGS. 18 and 19 may be an embodiment of a slidable (or, rollable) electronic device, and the structure of the electronic device 1800 according to various embodiments is not limited to the illustrated embodiment. For example, the electronic device 1800 may be implemented with various forms of slidable (or, rollable) electronic devices that include a fixed structure and a movable structure movable relative to the fixed structure and in which a display region is extended or reduced as a flexible display moves together with the movable structure.

Figure 20:
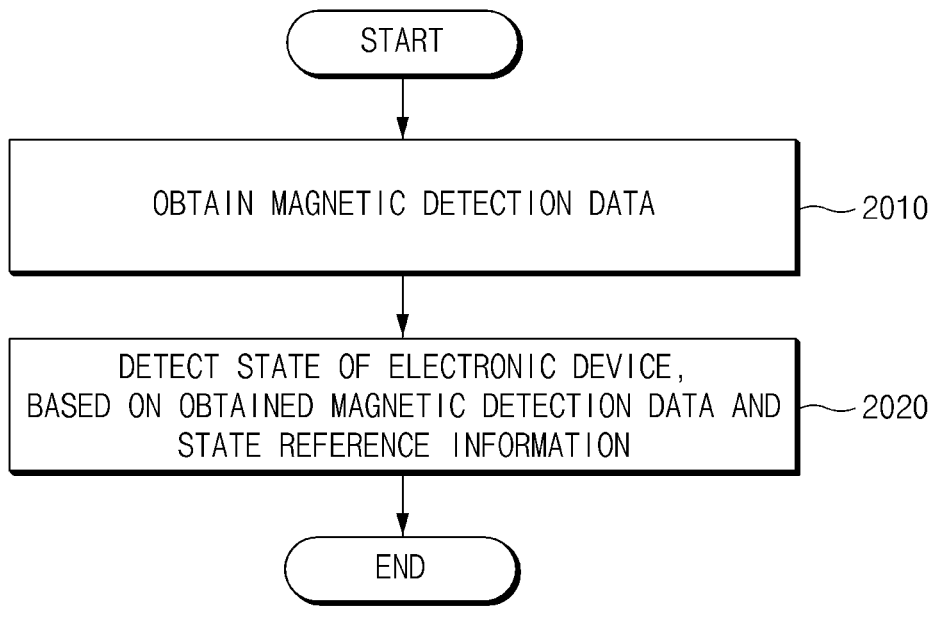
FIG. 20 is a flowchart illustrating an example operation configuration of an example electronic device according to various embodiments.

Hereinafter, an operation configuration of an electronic device according to an embodiment will be described with reference to FIG. 20. FIG. 20 is a flowchart illustrating an example operation configuration of an example electronic device according to various embodiments. Hereinafter, operations of the electronic device may be referred to as operations of a processor (e.g., the processor 120 of FIG. 1).

In operation 2010, the electronic device may obtain magnetic detection data. The electronic device according to an embodiment may detect a plurality of directional components including a first directional component and a second directional component of magnetic flux density using a sensor and may generate magnetic detection data for the plurality of directional components including the first directional component and the second directional component of the magnetic flux density. At least one of the first directional component or the second directional component of the magnetic flux density may have different values depending on states of the electronic device.

In operation 2020, the electronic device may detect a state of the electronic device, based on the obtained magnetic detection data and state reference information. The electronic device may calculate or determine a state of the electronic device corresponding to the detected first and second directional components of the magnetic flux density from the state reference information. For example, the electronic device may select a section corresponding to the second directional component and the first directional component (or, the sign of the first directional component) of the magnetic flux density included in the magnetic detection data from a plurality of sections of the state reference information and may detect, in the selected section, a state of the electronic device using any one of the first directional component and the second directional component of the magnetic flux density.

Figure 21:
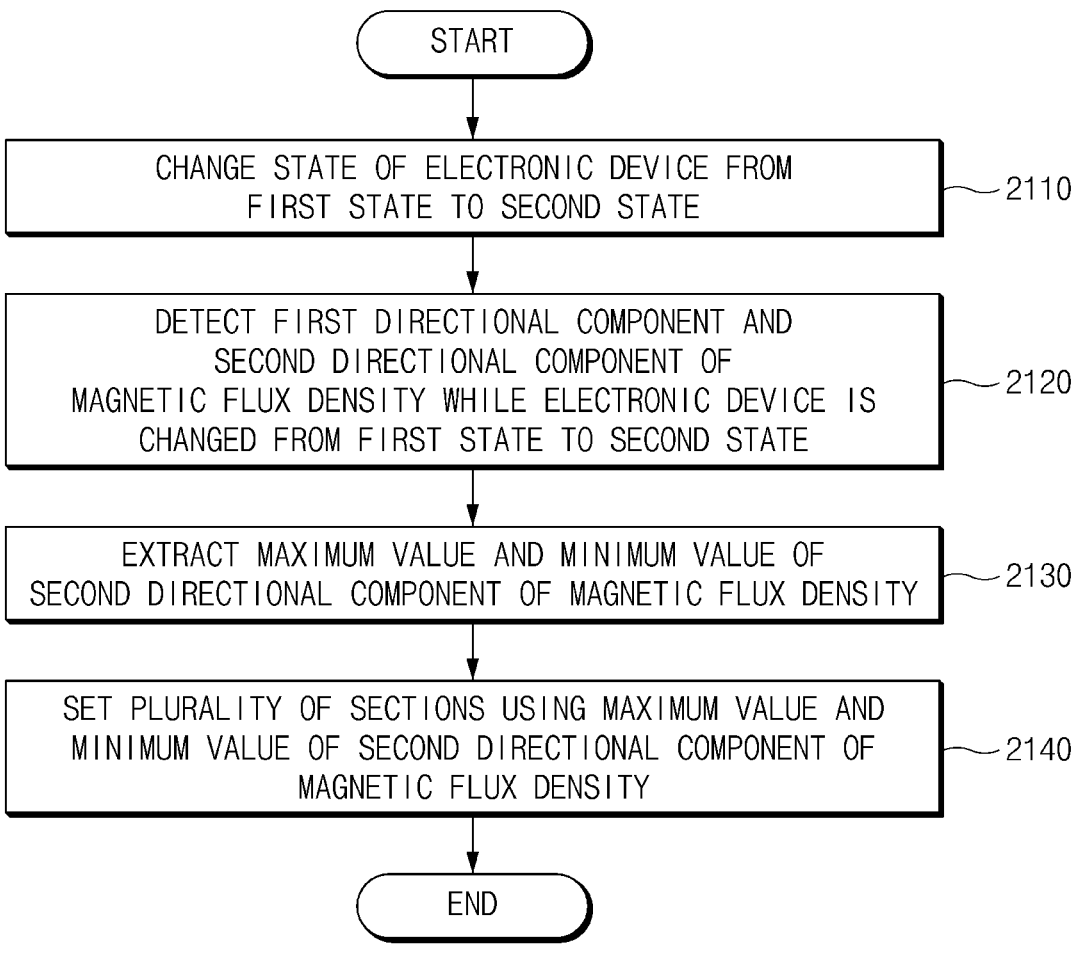
FIG. 21 is a flowchart illustrating an example operation configuration of an example electronic device according to various embodiments.

Hereinafter, an operation of generating state reference information by an electronic device according to an embodiment will be described with reference to FIG. 21. FIG. 21 is a flowchart illustrating an example operation configuration of an example electronic device according to various embodiments.

In operation 2110, the electronic device may change a state of the electronic device from a first state to a second state. For example, the electronic device may provide, through a display, a user interface that induces a user to change the electronic device from the first state to the second state through a user operation. In another example, the electronic device may control the electronic device such that the electronic device is changed from the first state to the second state by a mechanical operation.

In operation 2120, the electronic device may detect a first directional component and a second directional component of magnetic flux density while being changed from the first state to the second state.

In operation 2130, the electronic device may extract a maximum value and a minimum value of the second directional component of the magnetic flux density. For example, the maximum value of the second directional component of the magnetic flux density may have a positive value, and the minimum value may have a negative value.

In operation 2140, the electronic device may set a plurality of sections using the maximum value and the minimum value of the second directional component of the magnetic flux density. For example, the electronic device may set a plurality of sections divided with respect to points where the second directional component of the magnetic flux density has a first value (e.g., a value of 90% of the minimum value of the second directional component of the magnetic flux density) or a second value (e.g., a value of 90% of the maximum value of the second directional component of the magnetic flux density). The electronic device may set at least one effective section of the second directional component in which the second directional component of the magnetic flux density is greater than or equal to the first value and less than or equal to the second value and at least one effective section of the first directional component in which the second directional component of the magnetic flux density is less than the first value or exceeds the second value.

An electronic device according to an example embodiment may include a first housing (e.g., the first housing 510 of FIG. 5 or the first housing 1810 of FIG. 18), a second housing (e.g., the second housing 520 of FIG. 5 or the second housing 1840 of FIG. 18) fastened to the first housing so as to be movable relative to the first housing, a flexible display (e.g., the display 220) disposed on at least a portion of the first housing and at least a portion of the second housing, a magnet member (e.g., the magnet member 310 of FIG. 3A) having at least two polarities arranged in a first direction (e.g., the first direction x of FIG. 3A) on a flat surface thereof, a sensor (e.g., the sensor 240 of FIG. 2) that moves in the first direction along a central axis of the magnet member over the magnet member and detects at least two directional components including a first directional component and a second directional component of magnetic flux density as an arrangement of the second housing relative to the first housing is changed, a memory (e.g., the memory 250 of FIG. 2) configured to store state reference information about a state of the electronic device corresponding to the first directional component and the second directional component of the magnetic flux density, and a processor (e.g., the processor 260 of FIG. 2) operationally connected with the sensor and the memory. The processor may be configured to obtain magnetic detection data including the at least two directional components of the magnetic flux density from the sensor and detect a state of the electronic device, based on the obtained magnetic detection data and the state reference information.

According to an example embodiment, the magnet member may include a first surface (e.g., the first surface 310a of FIG. 3A) that faces the sensor, and the at least two polarities may be arranged in the first direction on the first surface of the magnet member.

According to an example embodiment, the magnet member may include a first magnet member (e.g., the first magnet member 1655*a* of FIG. 16) that represents a first pole and a second magnet member (e.g., the second magnet member 1655*b* of FIG. 16) that is adjacent to the first magnet member in the first direction and that represents a second pole different from the first pole.

According to an example embodiment, the processor may be configured to detect a state of the electronic device using the second directional component of the magnetic flux density and the state reference information, based on the second directional component of the magnetic flux density included in the magnetic detection data being greater than or equal to a first value (e.g., the first value V1 of FIG. 4) and less than or equal to a second value (e.g., the second value V2 of FIG. 4).

According to an embodiment, the processor may be configured to detect a state of the electronic device using the first directional component of the magnetic flux density and the state reference information, based on the second directional component of the magnetic flux density included in the magnetic detection data being less than the first value and exceeds the second value.

According to an example embodiment, the state reference information may include a plurality of sections divided based on a first value and a second value of the second directional component of the magnetic flux density. The processor may be configured to select one section from the plurality of sections, based on the second directional component and the first directional component of the magnetic flux density included in the magnetic detection data and detect, in the section, a state of the electronic device using one of the first directional component and the second directional component of the magnetic flux density.

According to an example embodiment, the plurality of sections of the state reference information may include at least one effective section of the second directional component in which the second directional component of the magnetic flux density is greater than or equal to the first value and less than or equal to the second value and at least one effective section of the first directional component in which the second directional component of the magnetic flux density is less than the first value and exceeds the second value. The processor may be configured to detect a state of the electronic device corresponding to the second directional component of the magnetic flux density, based on the selected section being the at least one effective section of the second directional component and detect a state of the electronic device corresponding to the first directional component of the magnetic flux density, based on the selected section being the at least one effective section of the first directional component.

According to an example embodiment, the at least one effective section of the second directional component may include a first section in which the first directional component and the second directional component have negative values, a second section in which the first directional component is saturated, and a third section in which the first directional component has a negative value and the second directional component has a positive value. The at least one effective section of the first directional component may include a fourth section in which the second directional component is less than the first value and a fifth section in which the second directional component exceeds the second value.

According to an example embodiment, the processor may be configured to select one section from the plurality of sections of the state reference information, based on at least one of the first directional component, a sign of the first directional component, the second directional component, or a sign of the second directional component of the magnetic flux density included in the magnetic detection data.

According to an example embodiment, the magnetic detection data may further include a third directional component of the magnetic flux density, and the processor may be configured to detect noise, based on the third directional component of the magnetic flux density.

According to an example embodiment, the processor may be configured to update the stored state reference information or generate new state reference information when a change of a magnetic field greater than or equal to a specified value is sensed through the sensor.

According to an example embodiment, the processor may be configured to detect the first directional component and the second directional component of the magnetic flux density using the sensor while the electronic device is changed from a first state to a second state, extract a maximum value and a minimum value of the second directional component of the magnetic flux density, and set a plurality of sections and generate the state reference information, based on the maximum value and the minimum value of the second directional component of the magnetic flux density.

According to an example embodiment, the electronic device may further include a fixed member (e.g., the first arm part 621 of FIG. 12 or the fixed member 1710 of FIG. 17) on which the magnet member is mounted and which includes a magnetic body, and the magnet member may protrude from the fixed member by a specified distance.

The example electronic device may further include a hinge structure (e.g., the hinge structure 600 of FIG. 6) that connects the first housing and the second housing. The display may include a folding region foldable based on movement of the hinge structure. The magnet member may be located on one region of the hinge structure, and the sensor may be located in the first housing. The processor may be configured to detect a folding angle of the electronic device, based on the obtained magnetic detection data and the state reference information.

The second housing may be fastened to the first housing so as to slide relative to the first housing. An exposed area of the display may be extended or reduced depending on movement of the second housing. The magnet member may be located on one region in the first housing, and the sensor may be located on one region of the second housing.

An example method for detecting a state of an electronic device that includes a magnet member having at least two polarities arranged in a first direction on a flat surface thereof and a sensor configured to move in the first direction along a central axis of the magnet member may include obtaining magnetic detection data by detecting, through the sensor, at least two directional components including a first directional component and a second directional component of magnetic flux density (e.g., operation 2010 of FIG. 20) and detecting a state of the electronic device, based on the obtained magnetic detection data and state reference information about a state of the electronic device corresponding to the first directional component and the second directional component of the magnetic flux density (e.g. operation 2020 of FIG. 20).

According to an example embodiment, a state of the electronic device may be detected by using the second directional component of the magnetic flux density and the state reference information, based on the second directional component of the magnetic flux density included in the magnetic detection data being greater than or equal to a first value and less than or equal to a second value.

According to an example embodiment, a state of the electronic device may be detected using the first directional component of the magnetic flux density and the state reference information, based on the second directional component of the magnetic flux density included in the magnetic detection data being less than the first value and exceeding the second value.

According to an example embodiment, the state reference information may include a plurality of sections divided based on a first value and a second value of the second directional component of the magnetic flux density. One section may be selected from the plurality of sections, based on the second directional component and the first directional component of the magnetic flux density included in the magnetic detection data. In the section, a state of the electronic device may be detected using one of the first directional component and the second directional component of the magnetic flux density.

According to an example embodiment, the magnetic detection data may further include a third directional component of the magnetic flux density, and noise may be detected based on the third directional component of the magnetic flux density.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and are intended to include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a first housing;

a second housing coupled to the first housing so as to be movable relative to the first housing;

a flexible display disposed on at least a portion of the first housing and at least a portion of the second housing;

a magnet including a first flat surface and a second flat surface opposite the first flat surface, wherein a first pole and a second pole having a polarity opposite to a polarity of the first pole are arranged sequentially in a first direction on the first flat surface and the second pole and the first pole are arranged sequentially in the first direction on the second flat surface;

a sensor configured to move in the first direction along a central axis of the magnet over the magnet and detect at least two directional magnetic flux density components including a first directional magnetic flux density component and a second directional magnetic flux density component as a position of the second housing relative to the first housing is changed;

memory configured to store state reference information about a state of the electronic device corresponding to the first directional magnetic flux density component and the second directional magnetic flux density component; and at least one processor, comprising processing circuitry, operationally connected with the sensor and the memory and configured individually or collectively to:

obtain magnetic detection data including the at least two directional magnetic flux density components from the sensor; and detect a state of the electronic device, based on the obtained magnetic detection data and the state reference information.

2. The electronic device of claim 1, wherein the first flat surface of the magnet is configured to face the sensor.

3. The electronic device of claim 1, wherein the magnet includes:

a first magnet configured to represent a first pole; and a second magnet configured to represent a second pole different from the first pole, the second magnet being adjacent to the first magnet in the first direction.

4. The electronic device of claim 1, wherein at least one processor comprising processing circuitry is configured individually or collectively to detect a state of the electronic device using the second directional magnetic flux density component and the state reference information, based on the second directional magnetic flux density component included in the magnetic detection data being greater than or equal to a first value and less than or equal to a second value.

5. The electronic device of claim 4, wherein at least one processor comprising processing circuitry is configured individually or collectively to detect a state of the electronic device using the first directional magnetic flux density component and the state reference information, based on the second directional magnetic flux density component included in the magnetic detection data being less than the first value or exceeding the second value.

6. The electronic device of claim 1, wherein the state reference information includes a plurality of sections divided based on a first value and a second value of the second directional magnetic flux density component, and wherein at least one processor comprising processing circuitry is configured individually or collectively to:

select one section from the plurality of sections, based on the second directional magnetic flux density component and the first directional magnetic flux density component included in the magnetic detection data; and detect, in the selected section, a state of the electronic device using one of the first directional magnetic flux density component or the second directional magnetic flux density component.

7. The electronic device of claim 6, wherein the plurality of sections of the state reference information include at least one effective section of the second directional magnetic flux density component in which the second directional magnetic flux density component is greater than or equal to the first value and less than or equal to the second value and at least one effective section of the first directional magnetic flux density component in which the second directional magnetic flux density component is less than the first value or exceeds the second value, and wherein at least one processor comprising processing circuitry is configured individually or collectively to:

detect a state of the electronic device corresponding to the second directional magnetic flux density component, based on the selected section being the at least one effective section of the second directional magnetic flux density component; and detect a state of the electronic device corresponding to the first directional magnetic flux density component, based on the selected section being the at least one effective section of the first directional magnetic flux density component.

8. The electronic device of claim 7, wherein the at least one effective section of the second directional magnetic flux density component includes a first section in which the first directional magnetic flux density component and the second directional magnetic flux density component have negative values, a second section in which the first directional magnetic flux density component is saturated, and a third section in which the first directional magnetic flux density component has a negative value and the second directional magnetic flux density component has a positive value, and wherein the at least one effective section of the first directional magnetic flux density component includes a fourth section in which the second directional magnetic flux density component is less than the first value and a fifth section in which the second directional magnetic flux density component exceeds the second value.

9. The electronic device of claim 8, wherein at least one processor comprising processing circuitry is configured individually or collectively to select one section from the plurality of sections of the state reference information, based on at least one of the first directional magnetic flux density component, a sign of the first directional magnetic flux density component, the second directional magnetic flux density component, or a sign of the second directional magnetic flux density component included in the magnetic detection data.

10. The electronic device of claim 1, wherein the magnetic detection data further includes a third directional magnetic flux density component, and wherein at least one processor comprising processing circuitry is configured individually or collectively to detect noise, based on the third directional magnetic flux density component.

11. The electronic device of claim 1, wherein at least one processor comprising processing circuitry is configured individually or collectively to update the stored state reference information or generate new state reference information when a a magnetic field change greater than or equal to a specified value is sensed through the sensor.

12. The electronic device of claim 11, wherein at least one processor comprising processing circuitry is configured individually or collectively to:

detect the first directional magnetic flux density component and the second directional magnetic flux density component using the sensor while the electronic device is changed from a first state to a second state;

extract a maximum value and a minimum value of the second directional magnetic flux density component; and set a plurality of sections and generate the state reference information, based on the maximum value and the minimum value of the second directional magnetic flux density component.

13. The electronic device of claim 1, further comprising:

a fixed member on which the magnet is mounted, the fixed member including a magnetic body, wherein the magnet protrudes from the fixed member by a specified distance.

14. The electronic device of claim 1, further comprising:

a hinge structure configured to couple the first housing and the second housing, wherein the display includes a folding region foldable based on movement of the hinge structure, wherein the magnet is located on one region of the hinge structure, wherein the sensor is located in the first housing, and wherein at least one processor comprising processing circuitry is configured individually or collectively to detect a folding angle of the electronic device, based on the obtained magnetic detection data and the state reference information.

15. The electronic device of claim 1, wherein the second housing is coupled to the first housing so as to be slidable relative to the first housing, wherein an exposed area of the display is extended or reduced based on sliding of the second housing, wherein the magnet is located on one region in the first housing, and wherein the sensor is located on one region of the second housing.

16. A method for detecting a state of an electronic device including a magnet including a first flat surface and a second flat surface opposite the first flat surface and a sensor configured to move in a first direction along a central axis of the magnet, the method comprising:

obtaining magnetic detection data by detecting, through the sensor, at least two directional magnetic flux density components including a first directional magnetic flux density component and a second directional magnetic flux density component; and detecting a state of the electronic device, based on the obtained magnetic detection data and state reference information about a state of the electronic device corresponding to the first directional magnetic flux density component and the second directional magnetic flux density component, wherein a first pole and a second pole having a polarity opposite to a polarity of the first pole are arranged sequentially in the first direction on the first flat surface and the second pole and the first pole are arranged sequentially in the first direction on the second flat surface.

17. The method of claim 16, wherein a state of the electronic device is detected using the second directional magnetic flux density component and the state reference information, based on the second directional magnetic flux density component included in the magnetic detection data being greater than or equal to a first value and less than or equal to a second value.

18. The method of claim 17, wherein a state of the electronic device is detected using the first directional magnetic flux density component and the state reference information, based on the second directional magnetic flux density component included in the magnetic detection data being less than the first value or exceeding the second value.

19. The method of claim 16, wherein the state reference information includes a plurality of sections divided based on a first value and a second value of the second directional magnetic flux density component, wherein one section is selected from the plurality of sections, based on the second directional magnetic flux density component and the first directional magnetic flux density component included in the magnetic detection data, and wherein in the selected section, a state of the electronic device is detected using one of the first directional magnetic flux density component or the second directional magnetic flux density component.

20. The method of claim 16, wherein the magnetic detection data further includes a third directional magnetic flux density component, and wherein noise is detected based on the third directional magnetic flux density component.

* * * * *